INVENTOR.
MORTON H. LEWIN
BY
Samuel Cohen
Attorney

INVENTOR.
MORTON H. LEWIN
BY Samuel Cohen
Attorney

LEGEND:
$k_1 = 0$
$l_1 = 0$
$h_n = 0$
$k_{n+1}$ IS NOT CONNECTED TO ANYTHING
F=1 DENOTES A TAG BIT.
F=1, D=0 INDICATES THAT THE TAG BIT=0
F=1, D=1 INDICATES THAT THE TAG BIT=1
F=0, D=0 INDICATES THAT THE TAG BIT IS ABSENT.
B = BIT READ OUT OF MEMORY.

INVENTOR.
MORTON H. LEWIN
BY Samuel Cohen
Attorney

INVENTOR.
MORTON H. LEWIN
BY Samuel Cohen
Attorney

INVENTOR.
MORTON H. LEWIN
BY
Samuel Cohen
Attorney

INVENTOR.
MORTON H. LEWIN
BY Samuel Cohen
Attorney

INVENTOR.
MORTON H. LEWIN
BY Samuel Cohen
Attorney

INVENTOR.
MORTON H. LEWIN
BY Samuel Cohen
Attorney

LEGEND:

ST, $k_{n+1}$ COMMON TO ALL GROUP LOGIC CIRCUITS $k_1 = 0$ $l_1 = 0$ $h_n = 0$ $l_{n+1}$ IS NOT CONNECTED TO ANY STAGE AFTER $n$ $F=1$ DENOTES A TAG BIT $B_1 - B_m$ = BIT PATTERN READ OUT OF A GROUP OF WIRES

IF THERE IS MORE THAN 1 BIT WHICH HAS THE VALUE "1" IN A GROUP, THERE IS MORE THAN 1 CHARACTER IN THE GROUP WHICH CORRESPONDS TO THE TAG.

INVENTOR.
MORTON H. LEWIN
BY
Samuel Cohen
Attorney

INVENTOR.
MORTON H. LEWIN
BY
Samuel Cohen
Attorney

CODE

| Fig 14a. |
|---|
| Fig 14b. |

Fig 14a.

MEMORY

| | | | | | | | | | | | | | | LINE |
|---|---|---|---|---|---|---|---|---|---|---|---|---|---|---|
| 100 | 1000 | 010 | 1000 | 100 | 0100 | 010 | 0001 | 100 | 0010 | 001 | 0001 | 100 | 0010 | 1 |
| 100 | 0100 | 100 | 0001 | 001 | 1000 | 100 | 0100 | 010 | 0100 | 010 | 0100 | 010 | 0100 | 2 |
| 100 | 0100 | 001 | 0100 | 010 | 0100 | 001 | 0001 | 001 | 1000 | 100 | 1000 | 100 | 1000 | 3 |
| 100 | 0001 | 010 | 0100 | 100 | 1000 | 001 | 0010 | 010 | 0010 | 010 | 1000 | 100 | 0010 | 4 |
| 100 | 0100 | 100 | 0100 | 100 | 0100 | 010 | 0001 | 010 | 0001 | 010 | 0001 | 100 | 0001 | 5 |
| 100 | 1000 | 100 | 1000 | 001 | 1000 | 100 | 1000 | 001 | 0100 | 100 | 0010 | 001 | 1000 | 6 |
| 100 | 0100 | 100 | 0010 | 010 | 1000 | 010 | 0001 | 001 | 0001 | 010 | 1000 | 010 | 0010 | 7 |
| 100 | 1000 | 100 | 1000 | 001 | 0100 | 100 | 0100 | 001 | 0001 | 100 | 0100 | 001 | 0001 | 8 |
| 100 | 0100 | 001 | 0001 | 001 | 0100 | 100 | 0001 | 001 | 0100 | 100 | 0001 | 001 | 0100 | 9 |
| 1 | 2 | 3 | 4 | 5 | 6 | 7 | 8 | 9 | 10 | 11 | 12 | 13 | 14 ← GROUP | |

INVENTOR.
MORTON H. LEWIN
BY Samuel Cohen
Attorney

Fig 14b.

| 1 | 2 | 3 | 4 | 5 | 6 | 7 | 8 | 9 | 10 | 11 | 12 | 13 | 14 ← | GROUP | WORD SELECTED |
|---|---|---|---|---|---|---|---|---|---|---|---|---|---|---|---|
| 100 | 1101 | 111 | 1111 | 111 | 1100 | 111 | 1111 | 111 | 1111 | 111 | 1111 | 111 | 1111 | 1a | 1 — 9 |
| 100 | 1000 | 110 | 1000 | 101 | 1100 | 110 | 1101 | 101 | 0111 | 101 | 0111 | 101 | 1011 | 2a | 1, 6, 8 |
| 100 | 1000 | 100 | 1000 | 001 | 1100 | 100 | 1100 | 001 | 0101 | 100 | 0110 | 001 | 1001 | 3a | 6, 8 |
| 100 | 1000 | 100 | 1000 | 001 | 1000 | 100 | 1000 | 001 | 0100 | 100 | 0010 | 001 | 1000 | 4a | 6✓ |
| 100 | 1000 | 100 | 1000 | 001 | 0100 | 100 | 0100 | 001 | 0001 | 100 | 0100 | 001 | 0001 | 5a | 8✓ |
| 100 | 1000 | 010 | 1000 | 100 | 0100 | 010 | 0001 | 100 | 0010 | 001 | 0001 | 100 | 0010 | 6a | 1✓ |
| 100 | 0100 | 101 | 0111 | 111 | 1100 | 111 | 0101 | 011 | 1101 | 110 | 1101 | 111 | 1111 | 7a | 2,3,5,7,9 |
| 100 | 0100 | 100 | 0111 | 111 | 1100 | 110 | 0101 | 011 | 0101 | 010 | 1101 | 110 | 0111 | 8a | 2,5,7 |
| 100 | 0100 | 100 | 0100 | 100 | 0100 | 010 | 0001 | 010 | 0001 | 010 | 0001 | 100 | 0001 | 9a | 5✓ |
| 100 | 0100 | 100 | 0010 | 010 | 1000 | 010 | 0001 | 001 | 0001 | 010 | 1000 | 010 | 0010 | 10a | 7✓ |
| 100 | 0100 | 100 | 0001 | 001 | 1000 | 100 | 0100 | 010 | 0100 | 010 | 0100 | 010 | 0100 | 11a | 2✓ |
| 100 | 0100 | 001 | 0101 | 011 | 0100 | 101 | 0001 | 001 | 1100 | 100 | 1001 | 101 | 1100 | 12a | 3,9 |
| 100 | 0100 | 001 | 0100 | 010 | 0100 | 001 | 0001 | 001 | 1000 | 100 | 1000 | 100 | 1000 | 13a | 3✓ |
| 100 | 0100 | 001 | 0001 | 001 | 0100 | 100 | 0001 | 001 | 0100 | 100 | 0001 | 001 | 0100 | 14a | 9✓ |
| 100 | 0001 | 010 | 0100 | 100 | 1000 | 001 | 0010 | 010 | 0010 | 010 | 1000 | 100 | 0010 | 15a | 4✓ |

LEGEND: TAG IS 100 AND IS APPLIED TO GROUP 1

— = DRIVER ACTIVE, FIRST STATE
═ = DRIVER ACTIVE, SECOND STATE
≡ = DRIVER ACTIVE, THIRD STATE
☐ = DRIVER HAS COMPLETED DRIVING ITS GROUP OF WIRES THROUGH ALL STATES ("COMPLETE" DRIVER)
NO UNDERLINE = DRIVER IS INACTIVE
✓ = READOUT ANSWER

INVENTOR.
MORTON H. LEWIN
BY Samuel Cohen
Attorney

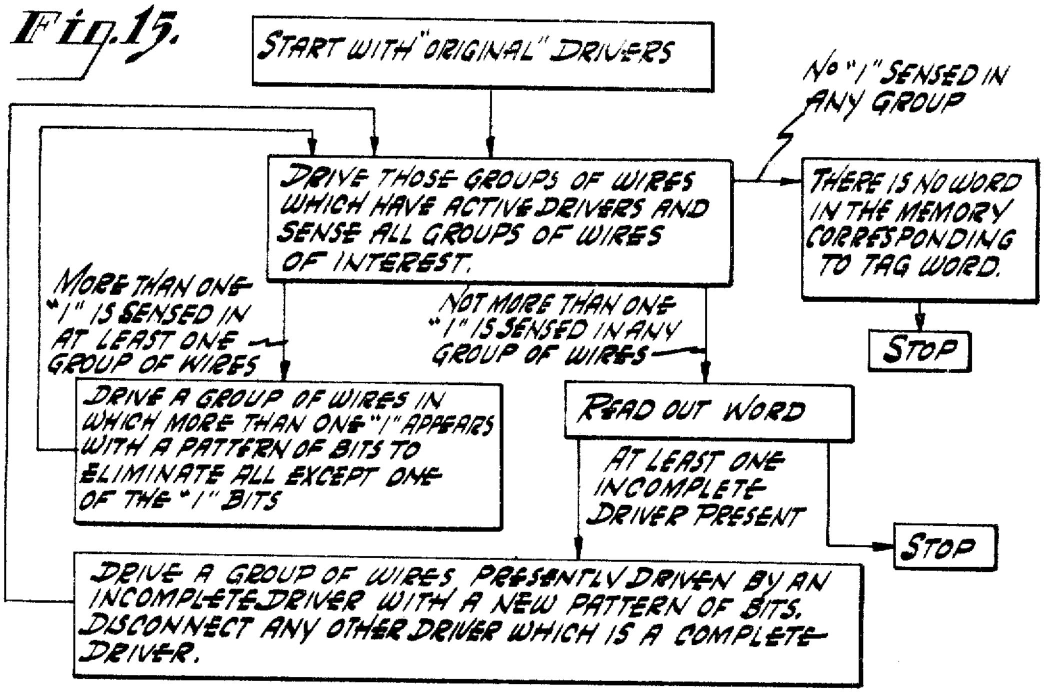

Fig. 15.

LEGEND:

MEMORY – A CONTENT ADDRESSED MEMORY COMPRISING STORAGE ELEMENTS ARRANGED IN ROWS AND COLUMNS. EACH ROW STORES A WORD. EACH STORED WORD INCLUDES A PLURALITY OF GROUPS OF BITS. EACH GROUP OF m BITS IN A STORED WORD HAS ONE "1" BIT AND m-1 "0" BITS.

GROUP OF WIRES – THE WIRES WHICH LEAD TO A GROUP OF STORAGE LOCATIONS WHICH STORE A GROUP OF BITS OF A MESSAGE.

ORIGINAL DRIVERS – THOSE DRIVERS WHICH APPLY THE TAG WORD TO THE MEMORY.

COMPLETE DRIVER – A NON-ORIGINAL DRIVER WHICH HAS DRIVEN THE GROUP OF WIRES TO WHICH IT IS CONNECTED WITH A NUMBER OF DIFFERENT PATTERNS OF BITS EQUAL TO THE NUMBER OF "1's" SENSED, THE LAST TIME MORE THAN "1" WAS SENSED IN A SAID GROUP OF WIRES.

PATTERN OF BITS – A GROUP OF m BITS, ONE OF WHICH IS A "1" AND M-1 OF WHICH ARE "0". THE "1" IS APPLIED TO A WIRE OF A GROUP WHICH WIRE CARRIED A "1" THE LAST TIME MORE THAN ONE "1" WAS SENSED.

INCOMPLETE DRIVER – A NON-ORIGINAL DRIVER WHICH HAS DRIVEN THE GROUP OF WIRES TO WHICH IT IS CONNECTED WITH A NUMBER OF DIFFERENT PATTERNS OF BITS LESS THAN THE NUMBER OF "1's" SENSED, THE LAST TIME MORE THAN ONE "1" WAS SENSED IN SAID GROUP.

INVENTOR.
MORTON H. LEWIN
BY Samuel Cohen
Attorney

United States Patent Office 3,329,937
Patented July 4, 1967

3,329,937

ORDERED RETRIEVAL OF INFORMATION STORED IN A TAG-ADDRESSED MEMORY

Morton H. Lewin, Princeton, N.J., assignor to Radio Corporation of America, a corporation of Delaware Filed Mar. 28, 1962, Ser. No. 183,187
14 Claims. (Cl. 340—172.5)

The present invention relates to a "content-addressed" (known also as an "associative" or "catalog") memory system. More particularly, the invention deals with the problem of retrieving from the memory more than one item of information (more than one word) associated with a given "tag word."

*Brief description of problem*

The content-addressed memories discussed below include a matrix of "storage" elements arranged in columns and rows. Each row in the memory permanently stores a word. The memory is interrogated by applying the bit or bits of a "tag word," sometimes known also as a "descriptor," to a column or columns of the memory. There may be one or more words in the memory which correspond to the tag word. A memory word is said to correspond to or to be called for by a tag word when the bits in the memory word which are in the columns to which bits of the tag word are applied are respectively equal to the bits of the tag word.

The present invention is a solution to the problem of retrieving from the memory all of the words corresponding to the tag word and, in addition, doing this in some predetermined order as, for example, chronological order. This is done, not as in the prior art, in which the different memory addresses are interrogated in sequence and the words retrieved arranged in order by following a complex sorting routine. Instead, only $2m-1$ passes at the most are required, where $m$ is the number of words in the memory corresponding to the tag word.

*Brief description of invention*

In the memory system of the present invention, when there is more than one word in the memory corresponding to the tag word, a system of logic is actuated. This system determines which columns in the memory have bits of different value in the different memory words corresponding to the tag word. These columns are subsequently driven by signals representative of the binary bits "one" and "zero" in accordance with a predetermined program in order to read out the words in the memory in a selected order.

*Brief description of drawings*

FIGS. 14*a* and *b* together show a chart which illustrates the interrogation routine for a content-addressed memory coded in a 3–4 code; and FIG. 15 is a generalized flow chart showing how any content-addressed memory may be interrogated according to the method of the present invention.

*General*

A number of blocks shown in the figures represent known circuits. The circuits of these blocks are actuated by electrical signals applied to the blocks. When a signal is at one level, it represents the binary digit "one" and when it is at another level, it represents the binary digit "zero." For the sake of the discussion which follows, it is arbitrarily assumed that a positive signal of greater than given magnitude represents the binary digit "one" and a negative signal of greater than a given magnitude represents the binary digit "zero." Also, to simplify the discussion, rather than speaking of an electrical signal being applied to a block or logic stage, it is sometimes stated that a "one" or a "zero" is applied to the block or logic stage.

Throughout the figures both capital and small letters are used to represent signals indicative of binary digits. For example, $k$ may represent the binary digit "zero" or the binary digit "one." $\bar{k}$ represents the complement of the $k$. In a number of the figures there is a subscript to the right of a small or capital letter. In general, although not always, the subscript represents the stage to which the binary digit is being applied. For example, if the stage being described is the $i$ stage and a signal $k$ is leaving that stage for the next stage on the right, that signal is legended $k_{(i+1)}$. The $k$ signal entering the $i$ stage is legended $k_i$.

Figures 1A, 1B, 1C, 1D, 1E, 2, 4:
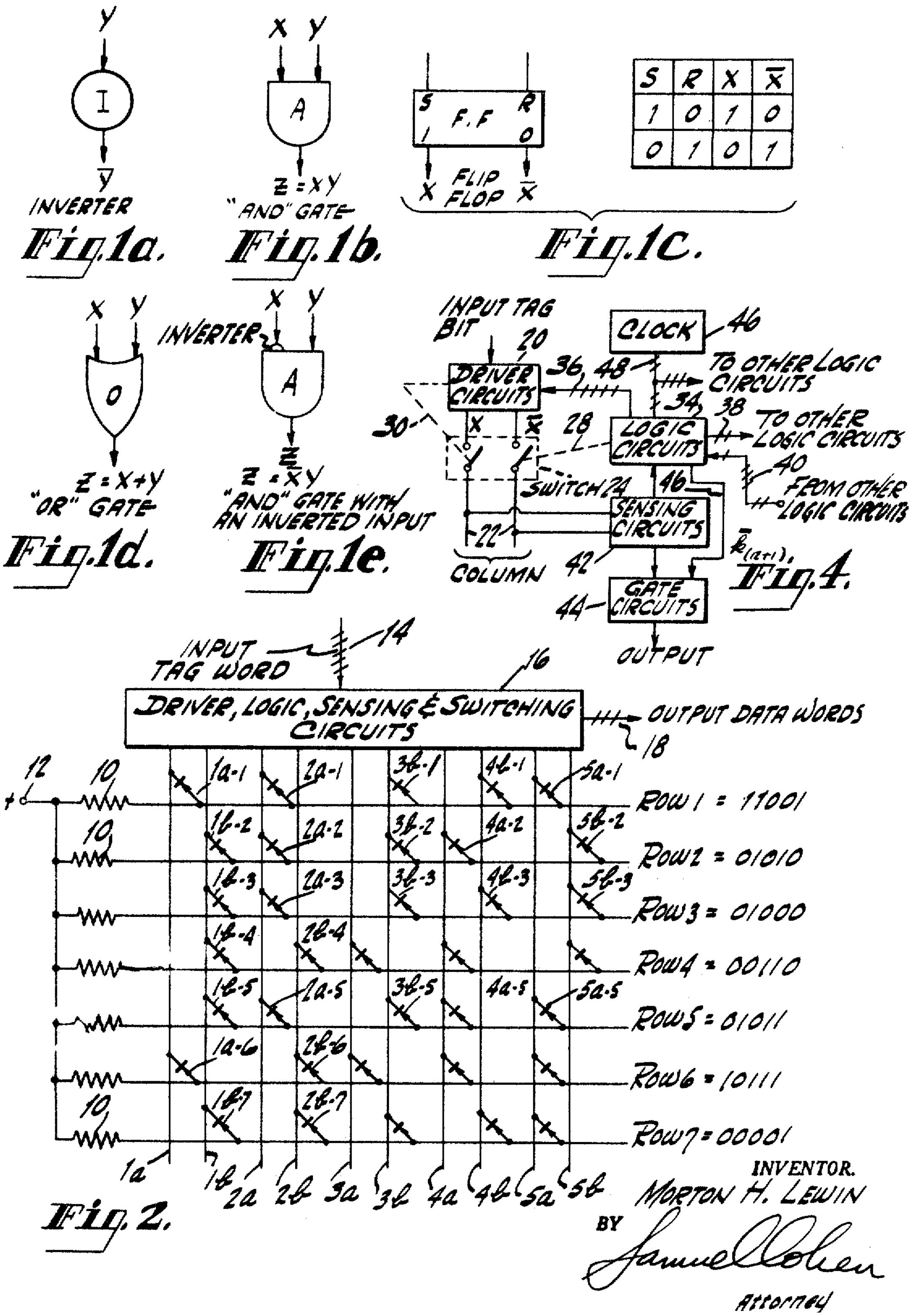
FIGS. 1*a*–1*e* are diagrams to explain symbols employed in various other figures.
FIG. 2 is a block and schematic circuit diagram of a content-addressed memory system according to the present invention.
FIG. 4 is a block circuit diagram showing in somewhat greater detail some of the circuits in FIG. 2.

In some cases letters are employed in Boolean equations as a means for describing the circuit operation. Some of these equations appear, for example, in FIGS. 1*a*–1*e*. These figures show the symbols employed for the elementary logic circuits in various figures. For example, FIG. 1*a* shows an inverter, FIG. 1*b* an "and" gate, FIG. 1*d* an "or" gate and so on.

The content-addressed memory illustrated in some of the figures which follow is arranged in columns and rows. It is arbitrarily assumed that each row stores a word. In the first memory discussed (the one of FIG. 2), each column consists of two wires. The left wire is legended the *a* wire and the right wire the *b* wire. The memory is interrogated by driving selected columns. A column is driven by a "1" by applying a "1" to the *a* wire and a "0" to the *b* wire. A column is driven by a "0" by applying a "0" to the *a* wire and a "1" to the *b* wire. When there is only one bit sensed in a column and that bit is a "1," 1, 0 (a "1" on the *a* wire and a "0" on the *b* wire) is sensed in the column. When there is only one bit sensed in a column and that bit is "0," 0, 1 (a "0" on the *a* wire and a "1" on the $b$ wire) is sensed in that column. When both the bits "one" and "zero" are sensed in a column, then 1, 1 is sensed in that column. When there is no bit sensed in a column, then 0, 0 is sensed in that column.

In a second content-addressed memory discussed later, each column of the memory consists of a group of column wires. Each row of the memory stores a word consisting of a number of groups of bits. Each two groups of bits represent a character. Each group of bits consists of one "1" bit and all the rest "0" bits. In one particular memory which is illustrated, the successive groups have four bits, then nine bits, then four bits, then nine bits and so on. This type of code is known as a 4–9 code since four bits followed by nine bits represent one character. The invention, however, is also applicable to content-addressed memories arranged in codes different than this, such as 3–4 codes, 5–7 codes, and so on.

A stored "word" is defined here as all or part of the information stored in one line of the memory. The number of bits or characters in the word will depend, of course, on the number of columns in the memory. In the event that this "word" is relatively long and corresponds, for example, to complete sentences or to a complete set of data describing, for example, a medical history, or the name, address, policy number, premium due date and so on of a policy holder, such "word" is sometimes referred to in this art as a "message." However, in the present application, the term "word" is used throughout to avoid any ambiguity between the description of the readout of one line of information (which may have many items of information) and several lines of information. In other words, in the present application, when it is stated that more than one word is read out of the memory, it is to be understood that the contents of more than one line of the memory is read out.

A driver may be active or inactive. A driver is inactive when it is not applying a signal indicative of a binary bit to the wire to which it is connected. In this condition, the driver is essentially "disconnected" from its column wire. An active driver may be an "original" or a "non-original" driver. An "original" driver is defined here as a driver to which a tag bit is applied. It remains on and does not change its condition during the entire memory interrogation. A "non-original" driver is one which applies a "1" or "0" to its wire in accordance with the interrogation routine to be discussed below. The condition of this driver can be changed (it can apply a "1" rather than a "0" or vice versa, or can be changed to an inactive driver) during the interrogation routine.

FIGURE 2

The content-addressed memory shown in FIG. 2 has seven rows and five columns. In practice, the memory may be much larger than this but the smaller size memory is employed for purposes of illustration. Each column in the memory has two leads $a$ and $b$ and each row has one lead. At each place in the memory where a column intersects a row, a diode is connected either from the $a$ column to the row lead (to represent storage of a binary "one") or the $b$ column to the row lead (to represent storage of a binary "zero") but not from both the $a$ and $b$ columns to the row lead. The diodes are identified by the legend $\alpha$, $\beta$ where $\alpha$ refers to the column and $\beta$ refers to the row. For example, there is a diode connected between column 1*a* and row 1 and this diode is legended 1*a*–1. In this example, the anode is always connected to the row lead, however, with different polarity power supply connections, the diodes would be connected in the opposite sense.

All of the row leads in the memory are connected through resistors 10 to a common terminal 12 to which a positive voltage is applied. The input tag word is applied through a bus 14 to a block 16 legended driver, logic, sensing and switching circuits. These circuits are discussed in more detail later. Their function is to apply the tag word to the memory and to extract from the memory the one or more output data words therein corresponding to the tag word. The output data word or words appear on bus 18.

The operation of the memory of FIG. 2 will be discussed by two examples. In the first, the tag word has two bits and these are applied to columns 1 and 2. The two bits are 1, 1. The "one" applied to column 1 causes diodes 1*b*–2, 1*b*–3, 1*b*–4, 1*b*–5 and 1*b*–7 to conduct since column lead 1*b* is made negative. Diodes 1*a*–1 and 1*a*–6 are cut-off since column lead 1*a* is made positive. The "one" applied to column 2 causes diodes 2*b*–4, 2*b*–6 and 2*b*–7 to conduct and diodes 2*a*–1, 2*a*–2, 2*a*–3 and 2*a*–5 to be cut-off.

As diodes 1*a*–1 and 2*a*–1 are cut off, the row 1 lead carries a positive voltage. Rows 2–7 are returned through conducting diodes 1*b*–2, 1*b*–3, 1*b*–4 and 2*b*–4, 1*b*–5, 2*b*–6, and 1*b*–7 and 2*b*–7, respectively, to a negative voltage. Rows 2–7 therefore all carry a negative voltage. Both wires of columns 3, 4 and 5 are all returned through an appropriate impedance in block 16 to a negative valve of voltage, however, not quite so negative as the voltage appearing on rows 2–7. Accordingly, the only diodes connected to columns 3, 4 and 5 which conduct are those in row 1, namely diodes 3*b*–1, 4*b*–1 and 5*a*–1. Positive voltages are developed on column wires 3*b*, 4*b* and 5*a*. The sensing circuits in block 16 sense the positive voltages in columns 3, 4 and 5 and sense also the positive voltages in the columns 1 and 2 to which the tag word is applied. The word sensed is therefore 11001 and this is the output data word from the memory. This example is a simple one since there is only one word in the memory corresponding to the tag.

In the next example, assume again that the input tag word is two bits and is applied to columns 1 and 2. The value of the tag word, however, is 0, 1. By an analysis similar to the one given above, it can be shown that there are three words in the memory corresponding to the tag word, namely the words in rows 2, 3 and 5. If it is attempted to read out the memory during the time that the tag word is applied, 0, 1 is sensed in column 3 and 1, 1 is sensed in columns 4 and 5. Any 1, 1 indicates that there is more than one word in the memory corresponding to the tag. In the present example there are three different words.

Figure 3:
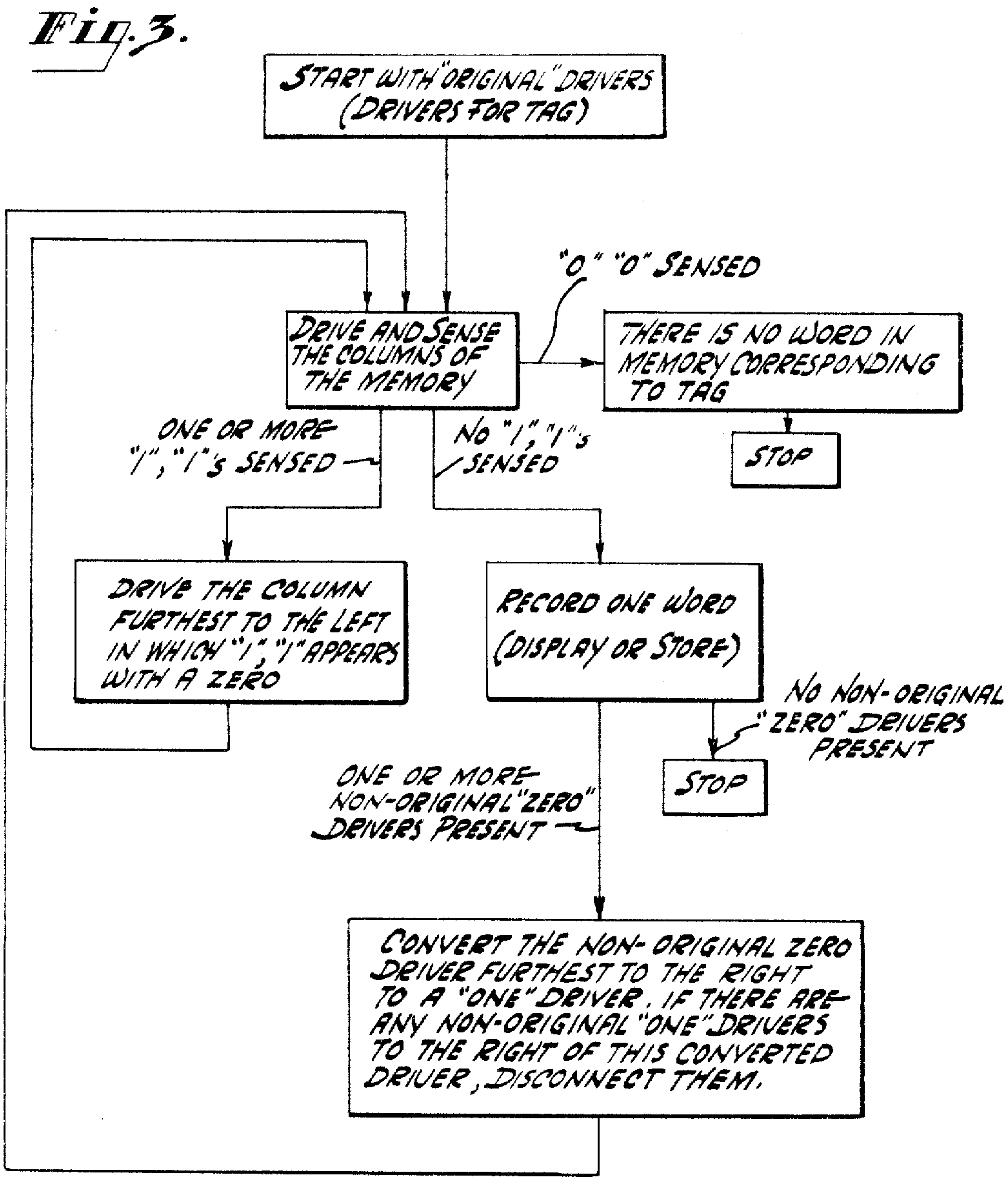
FIG. 3 is a flow chart describing the operation of the memory system of FIG. 2.

The way in which the three words in the memory corresponding to the tag are extracted from the memory is illustrated generally in the flow chart of FIG. 3. First the column furthest to the left at which 1, 1 is sensed is driven by a "zero." The driver which does this is termed as a "non-original 0" driver. In the present instance, column 4 is the furthest left column at which 1, 1 is sensed. Driving this column with a "zero" causes column wire 4*a* to develop a negative potential. Conducting diodes 4*a*–2 and 4*a*–5 cause rows 2 and 5 to go negative, leaving only row 3 at a positive potential. This positive potential is coupled, through diode 5*b*–3, to column wire 5*b* and a 0, 1 is sensed in column 5.

There are now no longer any columns at which 1, 1 appears. Accordingly, the first output word should be obtained. The first two bits in the output word are the bits of the tag word, namely 0, 1. A "0" is sensed in columns 3 and 5. One senses the same bit that is being driven, a "0," in column 4. The entire word read-out is therefore 01000. This is the word stored in row 3.

The next step is to drive with a "one" driver that column furthest to the right having a non-original "zero" driver. In the present instance, this refers to column 4. Driving with a "one" means applying 1, 0 to the column. When this is done, diode 4*b*–3 conducts forcing row 3 to assume a negative potential. Rows 2 and 5 are not coupled with diodes to negative columns, so these rows remain positive. The coupling through diodes 5*b*–2 and 5*a*–5 cause a 1, 1 to be sensed in column 5.

The next step is to drive with a "zero" to the column furthest to the left in which a 1, 1 appears (column 5 in this instance). This causes the 1, 1 signal in column 5 to change to 0, 1 and, as no other 1, 1 appears in any column, another answer is recorded—in this case 01010 (the word in row 2).

Next, the column furthest to the right having a non-original "zero" driver (column 5) is driven instead by a "1" driver and the last answer 01011 is obtained. Since there are no non-original "0" drivers remaining, the routine is completed.

In the interrogation routine described above, there are three words in the memory corresponding to the input tag word. There are five steps required to obtain these three words from the memory. The steps of recording the answer occur simultaneously with the driving steps and they are not counted in as they occupy no separate timing cycle. It can be proved that in the general case the number of steps required to extract $m$ words from the memory is $2m-1$.

In the discussion above, the words in the memory corresponding to the tag word appear in rows 2, 3 and 5. However, these words are extracted in the following order 01000 (row 3), 01010 (row 2), 01011 (row 5). These words are in binary ordered relation, that is, the word of lowest value is extracted first, the word of next value next, and the word of next value next. It can be shown that the interrogation routine described does extract the words in predetermined order regardless of their location in the memory. Thus, a separate time-consuming sort routine is not required. It is also possible to extract words from the memory in decreasing order of significance of the words. This is done, for example, by changing the order in which the columns are driven or by changing the initial assumption made as to the voltages which represent "zero" and "one."

In the examples given above, the tag word has two bits and is applied to columns 1 and 2. It should be appreciated that the tag word can have any number of bits up to the maximum number of bits in a memory word. It should also be appreciated that in the memory of the invention the tag bits can be applied to any of the columns in the memory. For example, in the case in which there are two bits, these can be applied to columns 2 and 5 or 3 and 4 or any other two columns. This is important in many applications as there may be many different criteria by which it is desired to extract the contents of the memory. In the case of a memory storing vehicle license plate numbers, for example, only the last two or the first three or any other combination of license plate characters may be known and yet it may be desired to extract all license numbers which correspond to these known characters. In cases of a memory storing information as to policy holders, it may be desired to extract information from the memory in accordance with the policy numbers, or in accordance with the ages of the policy holders, or in acccordance with the dates when premiums are due and so on.

FIGURE 4

FIG. 4 shows in somewhat greater detail the circuits of block 16 for one column of the memory. These circuits include driver circuits 20 which may be connected to the column 22 via a switch 24. The switch is shown as a mechanical switch, however, in practice, it may be an electronic switch made up of transistors, diodes or the like. In one practical circuit, the "switch" is actually part of the driver circuit itself as is discussed later. The switch may be controlled by the logic circuits, as indicated schematically by dashed line 28 or by the input tag bit, as indicated schematically by the dashed line 30 extending from the driver circuits 20. This is discussed in more detail later in connection with the driver circuits.

In the circuit of the present invention, in the event that a tag bit is applied to a driver circuit that driver circuit is thereafter known as an "original driver," as explained above. It continues to drive the column with which it is associated. Further, the switch 24 continues to remain in closed position connecting the driver circuit to the column.

In the event that the driver circuits 20 do not receive an input tag bit, they can be controlled by the logic circuits 34 which are connected to the driver circuits by bus 36. The logic circuits 34 also apply outputs to other logic circuits via bus 38 and receive inputs from other logic circuits via bus 40. The logic circuits also receive an input from the sensing circuits 42. The latter applies the output word it senses through a gate circuit 44 to an external circuit such as the buffer of a memory. The gate circuit 44 is controlled by the logic circuits 34 through lead 46.

The timing of the system of the present invention is controlled by a clock 46. It produces output pulses CP1, CP2 and CP3. These are applied through bus 48 to the logic circuits 34 for column 22 and to the logic circuits for the other columns of the memory.

FIGURE 5

Figure 5:
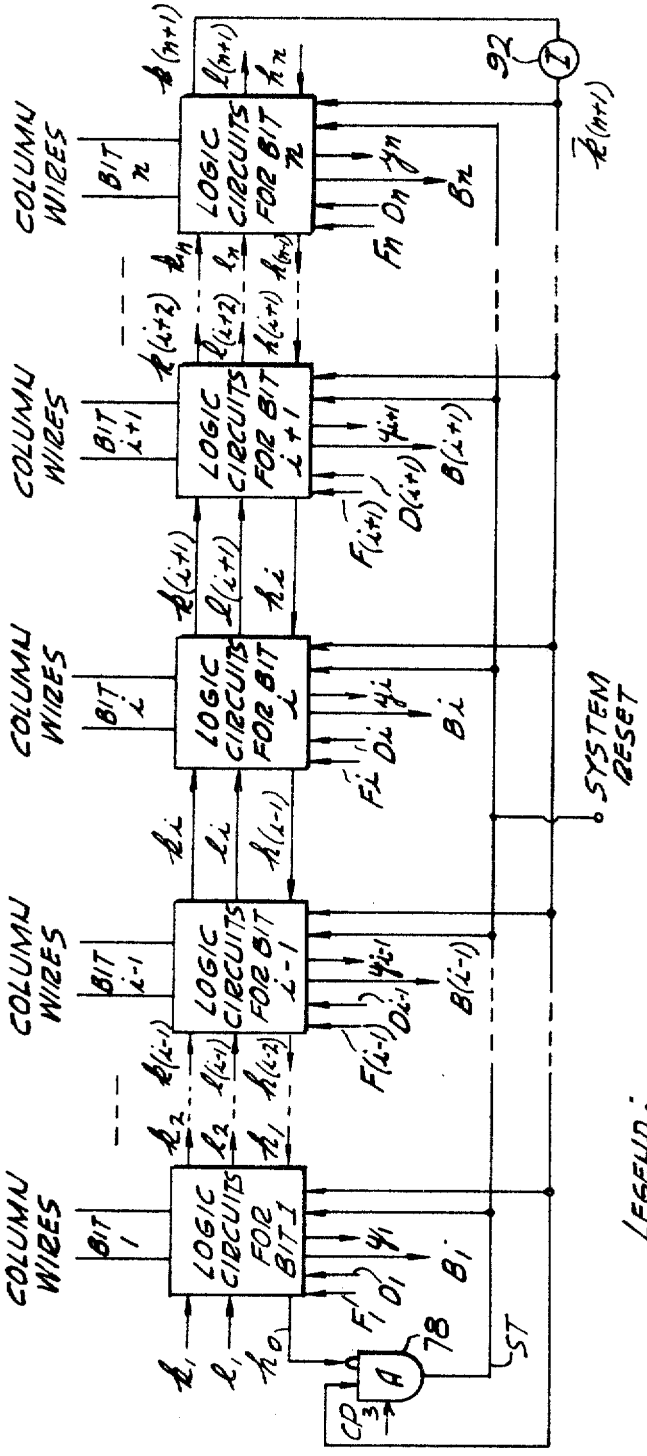
FIG. 5 is a block circuit diagram showing the interconnection among various logic circuits in the memory of the system of FIG. 2.

FIG. 5 illustrates the interconnection among the various logic circuits of the present memory system. At the center of the figure is a logic circuit for column $i$, one of the columns in the memory. This logic circuit is connected to the logic circuits for column $i+1$ and $i-1$. The logic circuits for the first column of the memory are legended "logic circuits 1" and the logic circuits for the last column of the memory are legended "logic circuits for bit $n$." The switches (24, FIG. 4) for each column are not shown in FIG. 5. FIG. 5 is not discussed in further detail, however, it may be useful in understanding the explanation of the logic diagram of FIG. 6.

FIGURE 6

Figure 6:
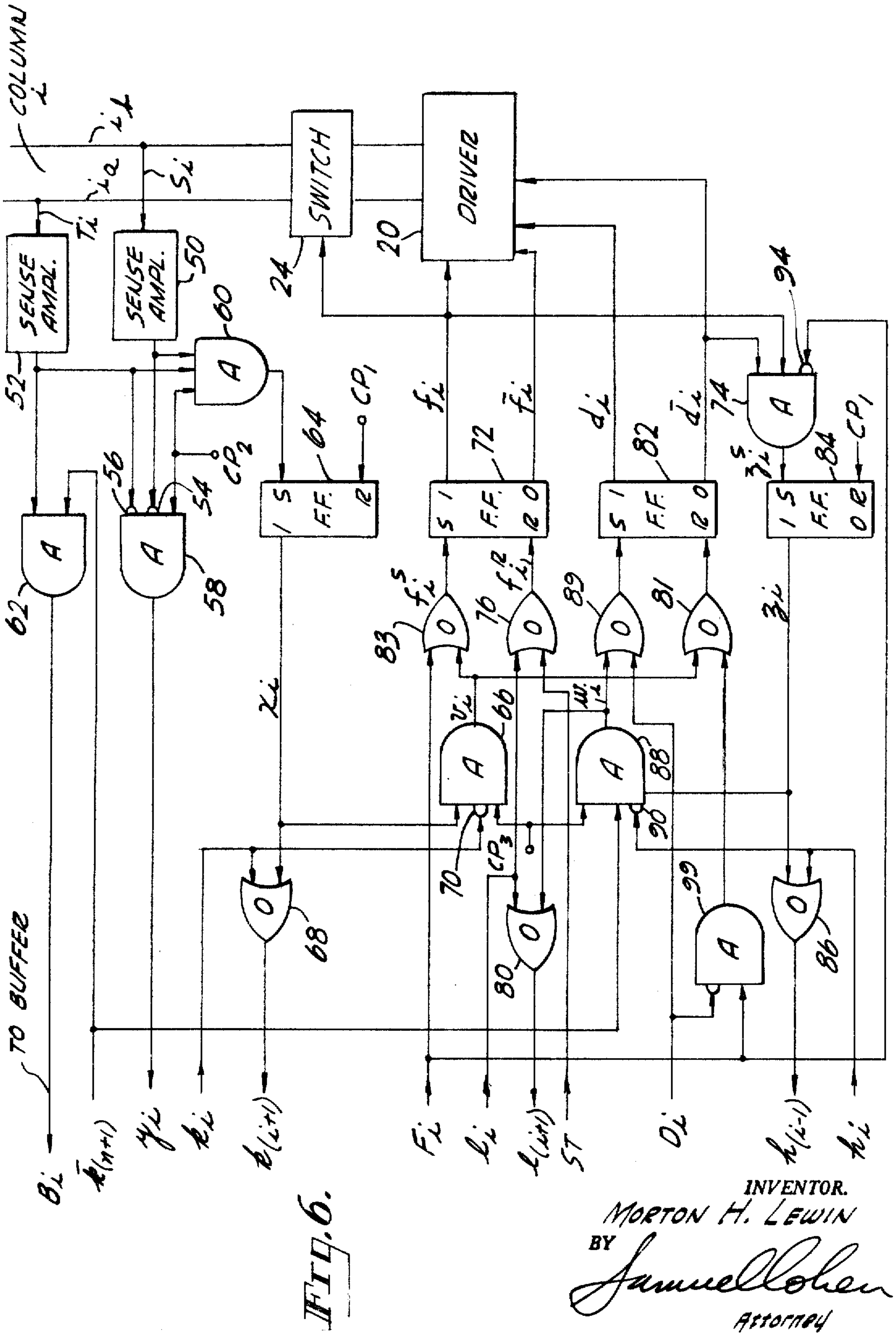
FIG. 6 is a more detailed block circuit diagram of the logic circuits $i$ of FIG. 5 associated with column $i$ of the content-addressed memory system of FIG. 2.

A more detailed showing of the logic circuits $i$ appears in FIG. 6. The logic circuits $i+1$, $i-1$ and so on are the same as circuits $i$ and are therefore not illustrated separately. The column $i$ leads $i_a$ and $i_b$ appear at the upper right. They are connected through a switch 24 to the driver 20. The leads are also connected to the sense amplifiers 50 and 52.

The outputs of the sense amplifiers 50 and 52 are applied through inverters 54 and 56 to "and" gate 58. The outputs of the amplifiers are also applied directly to "and" gate 60. The output of sense amplifier 52 serves also as one input to "and" gate 62.

"And" gate 60 is connected to the set terminal S of flip-flop 64. The latter 1 output $x_i$ serves as one of the inputs to "and" gate 66 and one of the inputs to "or" gate 68. A second input to "and" gate 66 is $\bar{x}_i$ derived from inverter 70.

The output of "and" gate 66 is applied to set terminal S of flip-flop 72 through "or" gate 83. The 1 output of flip-flop 72 is the $f_i$ signal applied to driver 20. $f_i$ is also applied as one of the inputs to "and" gate 74. The reset input R to flip-flop 72 is the output of "or" gate 76. This "or" gate receives an ST input from "and" gate 78 (see FIG. 5) and an $l_i$ input from the preceding logic stage. $l_i$ is also applied as one input to "or" gate 80.

The output $v_i$ or "and" gate 66 is applied through "or" gate 81 as a reset signal for flip-flop 82 and through "or" gate 83 as a set signal for flip-flop 72. The 0 output of flip-flop 82 serves as a second input to "and" gate 74. "And" gate 74 sets flip-flop 84.

The $z_i$ output available at the 1 output terminal of flip-flop 84 is applied as one input to "or" gate 86. The second input is $h_i$ from the preceding stage. $z_i$ is also applied as an input to "and" gate 88. The second input to "and" gate 88 is $\bar{h}_i$ from inverter 90. The third input to "and" gate 88 is $\bar{k}_{n+1}$ from inverter 92 (FIG. 5). The output $w_i$ of "and" gate 88 is applied through "or" gate 89 as a set signal for flip-flop 82. $w_i$ is also applied as the second input signal to "or" gate 80.

In the operation of the circuit of FIG. 6, the driver 20 has three possible states, determined by $f_i$ and $d_i$. If $f_i=0$, the driver is cut-off and is disconnected from the column wires by open switch 24. In this case, the column wires are terminated only in the sense amplifiers. If $f_i=1$, the polarity of the drive, that is whether the driver drives its column with a "one" (1, 0) or a "zero" (0, 1), is determined by $d_i$.

The timing for the system of FIG. 6 is controlled by the clock 46 of FIG. 4. The clock produces three, time spaced clock pulses CP1, CP2 and CP3. The first pulse CP1 controls the resetting of flip-flops 72 and 84. The second pulse CP2 controls the strobing (gating) the sense amplifiers. During this interval, the column signals are sensed. The third pulse CP3 is applied to "and" gates 66 and 88 and in this way controls the set states of flip-flops 72 and 82.

$F_i$ and $D_i$ are the inputs which indicate whether the driver is an original driver and, if so, the particular binary bit ("zero" or "one") the driver is to apply to its column. These inputs are initiated at the start of the interrogation and do not change until the interrogation is complete. $F_i=1$ denotes an original driver. The value of the $D_i$ bit, when $F_i=1$, indicates the particular bit the driver applies; when $F_i=1$, $D_i=1$, the driver applies a 1, 0; when $F_i=1$, $D_i=0$, the driver applies a 0, 1. When $F_i=0$, then $D_i=0$ and the driver is either inactive or is a "non-original" driver depending upon the states of the various logic stages as discussed more fully below.

If $F_i=1$, "or" gate 83 is actuated and flip-flop 72 becomes set. Thus, even if a "1" signal appears momentarily at $f_i^R$ (as will be seen later, this can only occur during CP3), flip-flop 72 returns to the set state ($f_i=1$) upon termination of this pulse. Sufficient time is allotted between clock pulses so that $f_i$ settles back to "1" by the time CP2 of the next cycle occurs. Also, if $F_i=1$, "and" gate 74 is inhibited (a "0" is applied to the "and" gate via inverter 94) and flip-flop 84 cannot become set. Therefore, $z_i$ remains "0." As the flip-flop 84 is reset at the beginning of each cycle by CP1, $z_i$ remains "0" for the entire interrogation.

If $D_i=1$ ($F_i$ must be "1" for this to occur), "or" gate 89 is actuated and sets flip-flop 82 ($d_i=1$). $d_i$ remains "1" during the interrogation. If $D_i=0$ while $F_i=1$, "and" gate 99 becomes enabled and resets flip-flop 82 through "or" gate 81. $d_i$ therefore becomes "0" and remains "0" during the interrogation. In this manner, if $F_i=1$, $D_i$ and $F_i$ control the state of the driver for the interogation, regardless of what signals occur during CP3.

At the beginning of each cycle, flip-flops 64 and 84 are reset by CP1 so that right after CP1 and before CP2, $x_i=0$. During this time, $z_i$ is also "0" except in the case when $F_i=0$, $f_i=1$ and $\bar{d}_i=1$. Under the latter conditions, which occur when driver 20 is a non-original "zero" driver, "and" gate 74 is enabled and sets flip-flop 84 right after CP1. $x_i=0$, $z_i=1$ therefore indicate a non-original "0" driver for column $i$.

When CP2 occurs, if a "1," "1" is sensed by amplifiers 50 and 52, "and" gate 60 is enabled and it sets flip-flop 64. This causes $x_i$ to change to "1." Thus, $x_i=1$ signifies a "1," "1" sensed in column $i$. It might be mentioned here that the column wires are also sensed when driven. However, in this case the signals sensed can only be "1," "0" or "0," "1." Therefore, "and" gate 60 will remain off and $x_i$ will remain "0."

The state of the variables for a given cycle, during an interval after CP2 has occurred but before CP3 has occurred, is considered next. The column has been read out during CP2 and $f_i$ and $d_i$ are about to be "set up" for the next cycle. Assume, first, that one or more "1's" have been sensed in the different columns. From the logic diagram it can be seen that $x_i$ and $k_i$ are applied to an "or" gate 68 to produce the output $k_{i+1}$. Also $k_1=0$, where $k_1$ is the input to the logic circuits for bit 1 (see FIG. 5). Thus, in Boolean form $$k_2=x_1$$
$$k_3=x_1+x_2$$
$$\vdots$$
$$k_i=x_1+x_2+\ldots+x_{i-1} \qquad (1)$$

In other words, if one or more 1, 1's are sensed to the left of column $i$, $k_i=1$. It is also clear from the Equation 1 that if $k_i=1$, then all the $k$'s to its right are also 1 (i.e., $k_{i+1}=k_{i+2}=\ldots=k_{n+1}=1$ if $k_i=1$). Further, if $k_i=1$, "and" gate 66 is inhibited so that $v_i$ is forced to remain 0. Also, for the case under consideration (i.e., one or more 1, 1's sensed), $k_{n+1}$ (from the $n$th column) must be 1 and $\bar{k}_{n+1}=0$ (FIG. 5). This prevents the readout of output bit $B_i$ and also inhibits "and" gate 88, keeping $w_i=0$.

If $k_i=0$, Equation 1 indicates that no 1, 1's are present in any columns to the left of column $i$. If $k_i=0$ and $x_i=1$, the column furthest to the left in which 1, 1 appears is column $i$. This is clear from FIG. 6. Under these conditions, during CP3 "and" gate 66 becomes enabled and $v_i$ becomes 1. Thus, $v_i=1$ (during CP3) indicates that column $i$ is the furthest left column at which 1, 1 is sensed. $v_i=1$ is applied through "or" gate 83 as a set signal for flip-flop 72 and through "or" gate 81 as a reset signal for flip-flop 82. This makes $f_i=1$ and $d_i=0$. $F_i=0$, $f_i=1$, $d_i=0$ indicates that the driver 20 is to act as a non-original "zero" driver during the next cycle. The $x_i$'s (hence the $k_i$'s) are temporarily stored in the flip-flops to prevent the conversion of the next driver to the right for a 1, 1 column from being immediately converted to a "0" driver. In summary, when one or more 1, 1's are sensed, the $k$ "or" gate chain (the gates corresponding to 68) and the $v$ gates (the "and" gates corresponding to 66) furnish the logic necessary for converting the driver for the furthest left column at which 1, 1 is sensed to a "0" driver.

The next case to be considered is the one in which no 1, 1's are sensed. As previously mentioned, this indicates that an answer has been reached. $k_{n+1}$ goes to "0," (see Equation 1) so $\bar{k}_{n+1}=1$. $\bar{k}_{n+1}=1$ is a priming signal for "and" gate 62 and allows the sense amplifier output bit $B_i$ to be applied through this "and" gate to a display or buffer stage (not shown). As every pair of sense amplifiers produce complementary outputs under these conditions, only one of these outputs need be employed. $\bar{k}_{n+1}=1$ serves also as a priming signal for "and" gate 88. But, all $x$'s equal "0" so that all "and" gates corresponding to gate 66 are inhibited.

The circuit of FIG. 6 indicates that $z_i$ and $h_i$ are inputs to "or" gate 86 which produces $h_{i-1}$. $h_n=0$ (see FIG. 5). Thus, in Boolean form $$h_{n-1}=z_n$$
$$h_{n-2}=z_n+z_{n-1}$$
$$h_i=z_n+z_{n-1}+\ldots+z_{i+2}+z_{i+1} \qquad (2)$$

It was previously shown that $z_i=1$ denotes the presence of a non-original "0" driver. Therefore, if one or more non-original "0" drivers is present to the right of bit $i$, $h_i=1$ (see Equation 2). Further, all $h_i$ inputs to the left will also be "1" (i.e., $h_{i-1}=h_{i-2}=\ldots h_0=1$ if $h_i=1$). If $h_i=0$, there are no non-original "0" drivers to the right of bit $i$ (see Equation 2). If, further, $z_i=1$, then the non-original zero driver furthest to the right is the driver for column $i$. When these conditions ($h_i=0$, $z_i=1$, $\bar{k}_{n+1}=1$) are fulfilled, during CP3, "and" gate 88 is enabled and $w_i$ becomes 1. Thus, $w_i=1$ (during CP3) indicates that the non-original zero driver furthest to the right is the driver for column $i$. $w_i=1$ sets the flip-flop 82 through "or" gate 89 making $d_i=1$, thereby converting the driver 20 to a "1" driver for the next cycle.

$w_i=1$ is also applied to "or" gate 80 and causes $l_{i+1}$ to be 1. The $l$ "or" gate chain (the gate corresponding to 80) propagates a signal to the right (see FIG. 5), so that $l_{i+1}=1$ causes $l_{i+2}=l_{i+3}= \ldots =l_n=1$. These signals in turn reset any of the flip-flops corresponding to 72, located to the right of bit *i*, which happen to be set. Therefore, any flip-flop 72 which is located to the right of bit *i*, and which is set, indicates that its driver is either an original driver or a non-original "1" driver (the non-original "0" driver furthest to the right is the one for column *i*). The flip-flops 72 for the original drivers are set again, after the $l$ signal terminates, by their respective F signals. However, the flip-flops 72 for the non-original drivers to the right of column *i* are reset by the $l$ signal and their drivers receive $F_i=0$. Their drivers therefore are made inactive. Thus, when no 1, 1's are sensed, the chain of "or" gates corresponding to 86 (i.e., the $h$ "or" gate chain) and the $w$ gates corresponding to 88 furnish the logic necessary to convert the leftmost non-original "0" driver to a "1" driver; the chain of "or" gates corresponding to 80 (i.e., the $l$ "or" gate chain) allows propagation of a signal which renders all non-original ("1") drivers to its right inactive.

A few additional comments are in order. First, when the driver for the furthest left column *i* at which 1, 1 is sensed is converted to a "0" driver, the $z_i$ in question changes from "0" to "1." This change will affect the signals propagating down the $h$ "or" gate (gate 86) chain (if there are no non-original "0" drivers to the right of column *i*). However, since this only occurs for the case when $\overline{k}_{n+1}=0$, any changes in the $h_i$'s will not affect the states of the flip-flops, as all gates corresponding to "and" gate 88 are inhibited. Second, when converting the furthest to the right non-original "0" driver to "1" driver, the $z_i$'s (hence the $h_i$'s) are held by flip-flops in order that the conversion not be followed immediately by a second conversion of the next right non-original "0" driver.

The $y_i$ outputs need not be detected in every bit position. It may be more convenient to use an additional column in the diode matrix, coupled to all rows with diodes, to give the "$y$" ("no answers") indication.

A reset pulse is applied to all logic circuits before the start of every interrogation. This is done after the tag word has been applied to the original drivers. The reset pulse resets all flip-flops 72 to erase any bits stored during the previous interrogation. The original driver flip-flops, of course, switch back to the set state before the start of the first cycle as $F_i=1$.

While not shown, if desired, the ST pulse may be applied to a storage flip-flop and the 1 output thereof applied to a two input "and" gate. The second input to the "and" gate is the $F_i$ signal. The output of the "and" gate is an input "or" gate 83 instead of the $F_i$ input thereto. The function of this circuit is to prevent flip-flop 72 from being reset after SP ends (SP endures only as long as CP3). However, if a system reset is used, as discussed above, this circuit is not necessary. If the circuit is desired, the system reset pulse is applied also to the reset terminal of the storage flip-flop.

Finally, the termination of the interrogation is determined by the coincidence of the following conditions.

$\overline{k_{n+1}}=1$ ("RECORD ANSWER")
$\overline{h_0}=1$ ("NO MORE NON-ORIGINAL "0" DRIVERS REMAIN")

Therefore, an "and" gate 78 (FIG. 5) with these two inputs and gated by CP3 may be used to generate a signal which stops the machine.

FIGURE 7

Figure 7:
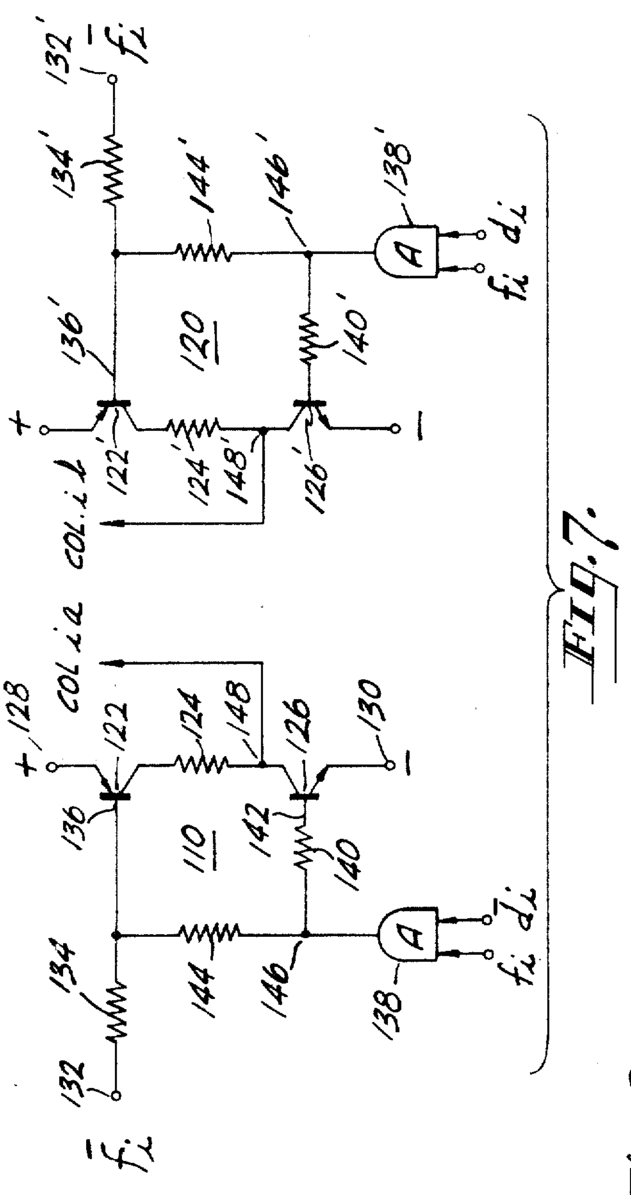
FIG. 7 is a schematic circuit diagram of the driver 20 of FIG. 6. This driver consists of two transistor driver stages one for each wire of column.

A more detailed showing of the driver 20 and switch 24 circuit appears in FIG. 7. The circuit includes a first driver circuit 110 and a second driver circuit 120. Since the circuits are identical except for the inputs, the same reference numerals primed are applied to the elements of circuit 120 as are applied to the elements for the circuit 110.

Driver circuit 110 includes a PNP transistor 122 connected in series with a resistor 124 and NPN transistor 126. Terminal 128, to which the emitter of transistor 122 is connected, is returned to a positive voltage source and terminal 130, to which the emitter of transistor 126 is connected, is returned to a negative voltage source.

The input signal $\overline{f}_i$ is applied from terminal 132 through resistor 134 to the base 136 of transistor 122. The input signals $f_i$ and $\overline{d}_i$ are applied to "and" gate 138. Its output signal is applied through a resistor 140 to the base 142 of transistor 126. A voltage divider resistor 144 is connected between the base 136 of transistor 122 and connection 146.

As already mentioned, driver circuit 120 is similar to driver circuit 110. It receives an input signal $\overline{f}_i$ applied to terminal 132'. However, the other input to the circuit consists of signals $f_i$ and $d_i$ rather than $f_i$ and $\overline{d}_i$.

The collector of transistor 126 is connected to column *ia* and the collector of transistor 126' is connected to column *ib*. As previously discussed, in the operation of the circuit of FIG. 7 it is desired that: when $f_i=0$, both drivers be cut-off; when $f_i=1$ $d_i=1$, the first driver 110 apply a 1 to column *ia* and the second driver 120 apply a 0 to column 1*b*; when $f_i=1$ and $d_i=0$, the first driver 110 apply a 0 to column *ia* and the second driver 120 apply a 1 to column *ib*.

Assume first that $f_i=0$. This means $\overline{f}_i=1$, that is, a positive voltage is applied to input terminal 132. This positive voltage causes transistor 122 to be cut-off. Similarly, the positive voltage applied to terminal 132' causes transistor 122' to cut-off. As $f_i=0$, "and" gates 138 and 138' are inactivated and a "0," that is, a negative voltage appears at connections 146 and 146'. This negative voltage cuts off transistors 126 and 126' and the points 148 and 148' in the circuit, to which the column wires are connected, essentially float. Under these conditions, then, the inputs to the drivers are such that the driver transistors act as open switches so that the inputs effectively disconnect the column wires from the drivers.

Assume now that $f_i=1$ and $d_i=1$. When $d_i=1$, "and" gate 138 is cut-off and connection 146 becomes negative. This causes transistor 126 to cut-off. When $f_i=1$, $\overline{f}_i$ represents a negative voltage. This is applied to terminal 132 and causes transistor 122 to conduct. The column *ia* wire is connected through an impedance in the sense amplifier to a value of voltage such that under these conditions point 148 is positive so that column *ia* wire is also positive. As one example, the column *ia* wire may be connected through some value of impedance to ground.

When $d_i=1$ and $f_i=1$, "and" gate 138' is activated. Connection point 146' now becomes positive. This causes transistor 126' to conduct. Under the same conditions, terminal 132' is negative and current flows through the voltage divider made up of resistors 134' and 144'. The values of resistors 144' and 134' are so chosen that the voltage at the base 136' is positive to an extent such that transistor 122' does not conduct appreciably. Under these conditions, the collector of transistor 126' is negative and the column *ib* wire is negative. To summarize, when $f_i=1$ and $d_i=1$, column *ia* becomes positive and column *ib* becomes negative and this corresponds to driving column *i* with 1, 0.

Assume now that $f_i=1$ and $d_i=0$. Now "and" gate 138 is enabled and "and" gate 138' is disabled. Transistors 126 and 122' now conduct and transistor 126' is cut-off. Transistor 122 does not conduct appreciably. Accordingly, the column *ia* wire is made negative and the column *ib* wire is made positive. This corresponds to driving column *i* with 0, 1.

*General discussion*

In the content addressed memory shown in FIG. 2 and having logic circuits interconnected as shown in FIG. 5, different words can be extracted in a certain sequence. With the routine described, if there is more than one word in the memory corresponding to the tag word, these words are read out of the memory in lexicographical order with the word of lowest value read out first. Using the same routine but a different manner of interconnecting the logic circuits for the various columns, it is possible to read out the words in the memory in a different order. This is illustrated in the simplified showings of FIGS. 8*a* and 8*b*.

Figure 8A:
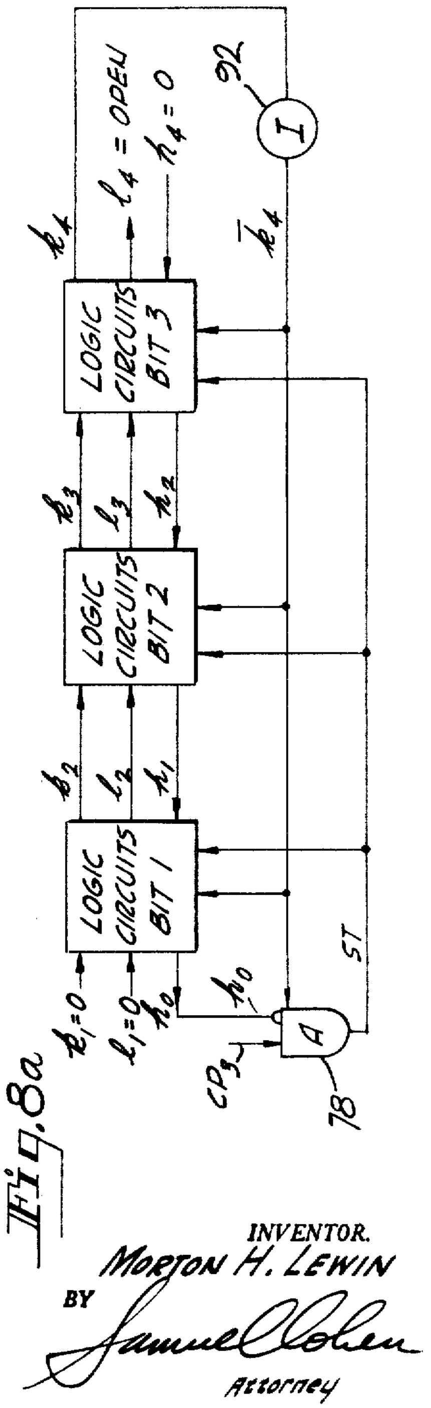
FIGS. 8*a* and 8*b* are block circuit diagrams to illustrate how the logic circuits for a content-addressed memory may be interconnected in different ways.

FIG. 8*a* shows the logic circuits comparable to those of FIG. 5 which would be required for a memory with three columns. The interconnection of logic circuits is exactly as shown in FIG. 5. It is possible, however, to interconnect the logic circuits in another way. For example, $k_4$ and $l_4$ can connect directly to $k_1$ and $l_1$. Similarly, $h_4$ can connect directly to $h_0$. Now, however, the $k_3$, $l_3$ and $h_2$ leads may be opened. The $k_3$ output of logic circuit 2 may then be fed back through an inverter similar to 92 to all of logic circuits. The $l_3$ output of logic circuit 2 is left open. The $h_2$ input to logic circuit 2 is made "0." The $k_3$ input to logic circuits for bit 3 is made 0. The $h_2$ input for the logic circuits of bit 3 is applied to the inhibit terminal of an "and" gate comparable to 78. What is described above, is the interconnection of logic circuits in a manner somewhat comparable to that of a ring circuit, which can be opened between any pair of logic circuits. If a circuit of this nature is interrogated in accordance with the interrogation routine previously described, the words stored in the memory appear at the output of the memory in a different order than previously discussed. For example, if the logic circuits for bit 2 are effectively made the last logic circuits in the group, then the words will be read out of the memory in chronological order but with bit 2 considered the bit of least significance and bit 3 considered the bit of most significance. For example, if the words read out are 101, 001, 100, they will be read out in the following order: 100, 001, 101. With the circuits interconnected as in FIG. 8*a*, however, the words are read out in the following order: 001, 100, 101.

Figure 8B:
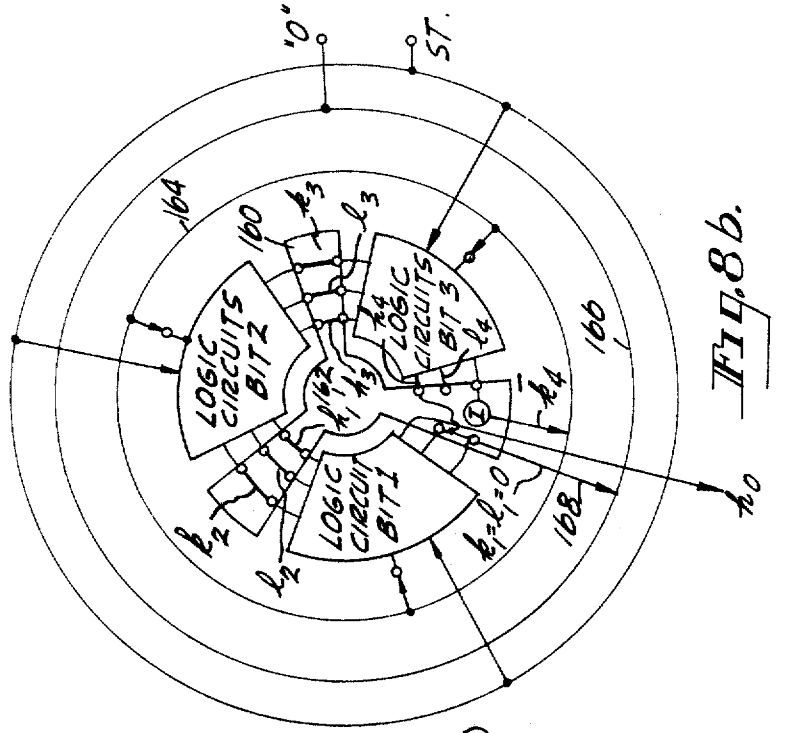

The circuit of FIG. 8*b* shows a simple way of interconnecting the various logic circuits so that they function in the manner just described. The member 160 is formed of an insulating material and it is capable of rotating about the center axis 162. The three arms of the member each have mounted thereon terminals between some of which conductors extend. In the position of the switch shown, the output of the logic circuits for bit 1 are applied as inputs to the logic circuits for bit 2. The output of the logic circuits for bit 2 are applied as inputs to the logic circuits for bit 3. The $\bar{k}_4$ output of the logic circuits for bit 3 is connected back to all three other logic circuits via lead 164. $l_4$ is connected to an open circuit. $h_4$, $k_1$ and $l_1$ are connected to lead 166 to which a "0" is applied.

If the insulator member 160 is moved through 120° in the clockwise direction, the interconnection between the various logic circuits change. Now, the first logic circuits in the ring are the logic circuits selected for bit 2. The second circuits are those for bit 3 and the third circuits are those for bit 1. The $k$ output of the logic circuits for bit 1 is now fed back through an inverter and lead 164 to all logic circuits. In a similar manner, the $h$ input of the logic circuits for bit 1 and the $k$ and $l$ input for the logic circuits for bit 2 will be connected to "0" via wiper 168 and lead 166 and so on.

Three stages have been shown in the above example for simplification. Clearly, the same techniques can be applied to a ring of many more ($n$) stages.

FIGURE 9

In the memory shown in FIG. 2, each column of the memory includes two column wires and each column is capable of storing a binary bit in each row of the memory. The present invention is not limited to this specific type of memory. It is applicable also to content-addressed memories of the type shown generally in FIG. 9. This memory consists of different groups of column wires. The first group 1 has four wires, the second group has nine wires, the third group 3 has four wires, the fourth group (not shown) has nine wires and so on. In one line of the memory, the memory element (diode) for a group of nine wires stores a code containing one "1" (and eight "0's") while the memory element (diode) for a group of four wires stores a code containing one "1" (and three "0's"). This is known as a 4–9 (or "one out of four, one out of nine") code and is comparable to a code commonly used in punched cards. One four bit plus one nine bit group of this type, together, represent one character. Together, the four plus nine bits (each of which contains only one "1") can be permuted in 36 different ways and can therefore represent 36 different characters. In one practical memory, the word stored in each row of the memory may be 80 characters in length and the memory therefore may have a total of 1041 column wires (13 for each character plus one for the power supply). The memory may, of course, have many more characters in each line if desired. The number of rows will depend, of course, on the number of words to be stored in the memory.

Figure 9:
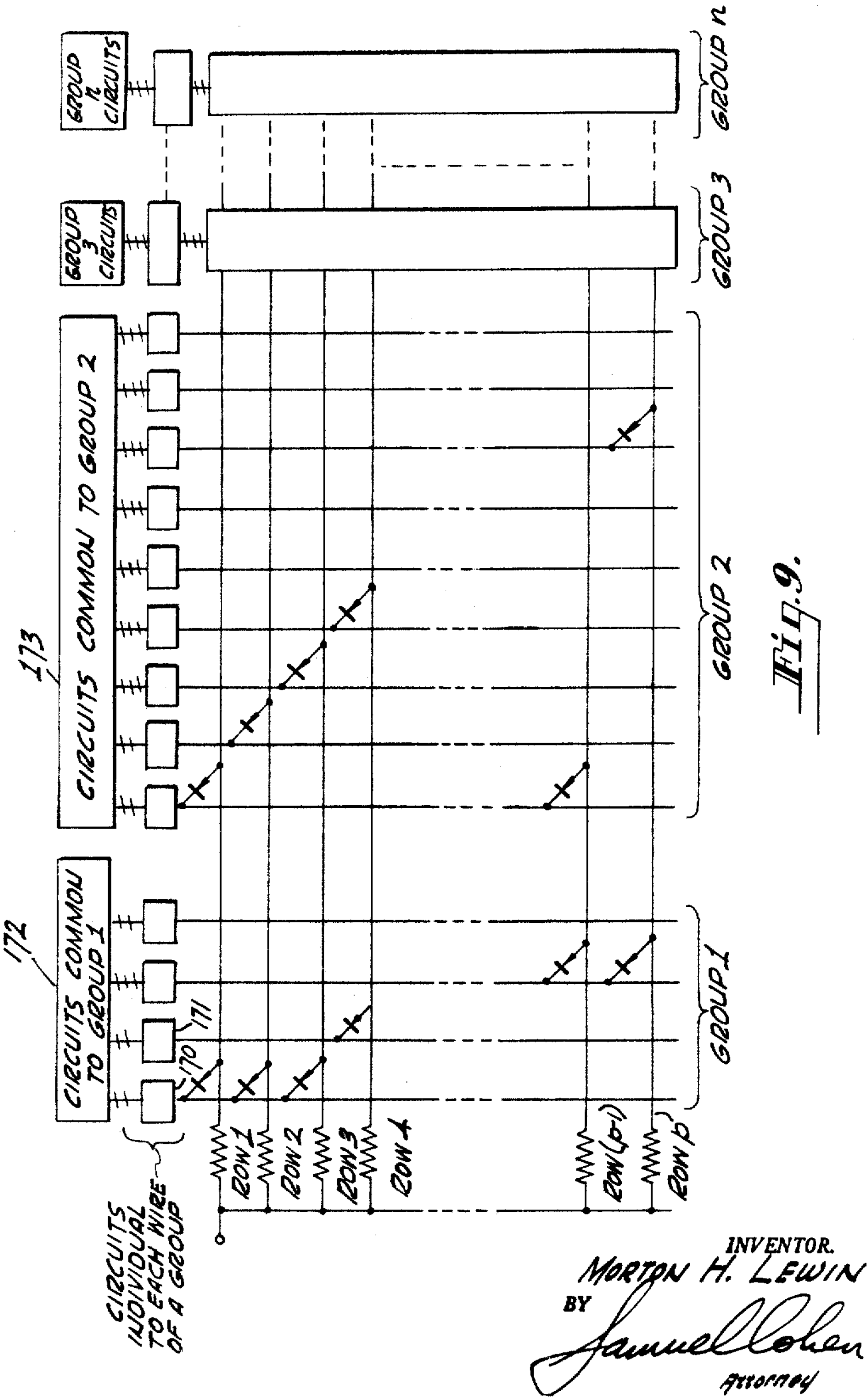
FIG. 9 is a block and schematic circuit diagram of another type of content-addressed memory system embodying the present invention.

The operation of the memory of FIG. 9 is quite analogous to that of the memory of FIG. 2. In the example illustrated, in groups 1 and 2, the first row stores the character 1000, 100000000; the second row stores the character 1000, 010000000; the $n$'th row stores the character 0010, 000000100.

There are certain circuits which are individual to each wire of a group. These are illustrated generally by the blocks 170, 171 and so on. Further, there are circuits common to all wires of a group. Such circuits are shown at 172, 173 and so on. These circuits are discussed in more detail later.

Figure 13:
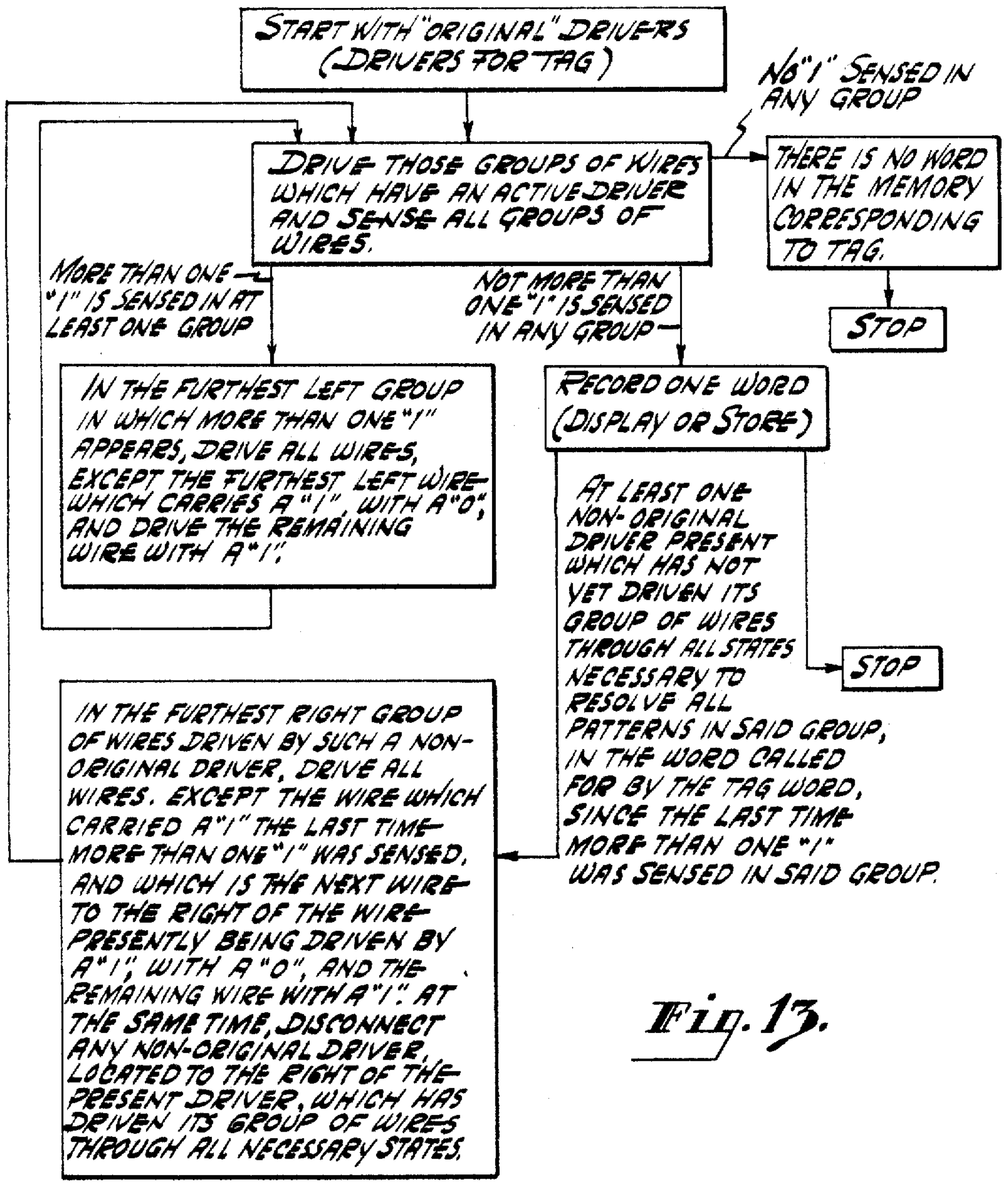
FIG. 13 is a flow chart describing the operation of the memory system of FIG. 9.

The way in which more than one word associated with a given tag word can be retrieved from the memory is analogous to what has already been described in connection with the memory of FIG. 2. The flow chart for the memory of FIG. 9 is shown in FIG. 13. The application of the flow chart to a particular memory is illustrated in FIG. 14.

*FIGURES 13 and 14*

FIG. 14 shows at the upper portion of the sheet the words stored in nine lines of a memory. Each message has 14 patterns of bits. In practice, the memory may have many more than nine lines and each word may have many more than 14 groups of bits. The code employed is a 3–4 code rather than a 4–9 code. There are two reasons. One is for the purpose of simplifying the explanation. The other is to show that the interrogation routine to be discussed is general and can be applied to a content-addressed memory arranged in any code.

To start with, the tag word is applied to the memory. The tag word assumed is 100 and this tag word is applied to the first group of wires in the memory. It might be mentioned, incidentally, that as in the memory of FIG. 2, the tag word or words can be applied to any one or more groups of wires. For example, the tag word may be 010, 100, 0010 and it may be applied to groups 3, 5 and 6, respectively, of the column wires.

When the tag word 100 is applied to the first group of column wires, the groups of bits appearing on line 1*a* are sensed. It will be noted that more than one "1" appears in groups 2 through 14. It may also be seen that 100 appears in group 1 on all nine lines of the memory. Therefore, the tag word 100 applied to group 1 selects all nine words stored in the memory. In a practical application, of course, the tag normally does not correspond to all words in the memory.

The routine shown in FIG. 13 indicates that when more than one "1" is sensed in at least one group of column wires, in the furthest left group in which more than one "1" appears, all wires except the furthest left wire which carries a "1" are to be driven with a "0" and the remaining wire is to be driven with a "1." Applying this to the particular example, group 2 is the furthest left group in which more than one "1" appears. The furthest left wire carrying a "1" is the first wire of group 2. This wire is driven with a "1" and all remaining wires are driven with a "0." Accordingly, group 2 is driven with 1000. The tag word continues to be applied to group 1.

The groups of bits appearing on line *2a* are now sensed in the memory. These are the bits which appear in the lines of the memory which corresponds to the two active drivers, that is, the drivers for groups 1 and 2. These drivers are driving their groups of wires with 100, 1000, respectively. 100, 1000 together appear in groups 1 and 2 on lines 1, 6 and 8 and therefore these words are the ones selected. Of the groups of bits sensed, some still have more than one "1."

The routine of FIG. 13 now indicates that again the furthest left group in which more than one "1" appears is to be driven with a non-original driver. All wires in this group except the furthest left wire which carries a "1" are to be driven with a "0" and the remaining wire is to be driven with a "1." Applying this to the example, the furthest left group in which more than one "1" appears is group 3. The number sensed is 110. Therefore, group 3 must be driven with 100 as shown in line *3a*. When this is done, the words appearing on lines 6 and 8 are selected.

At this time, the next group having more than one "1" is group 6. Its character is 1100. Therefore, group 6 is driven with 1000. When this is done, there is no longer more than one "1" sensed in any group. Accordingly, one word in the memory must be read out. This is the word which appears on line *4a* and it is the one that corresponds to the word written on line 6 of the memory.

There is now at least one non-original driver present which has not yet driven its group of wires through all states necessary to resolve all characters stored in a group of wires. Hereafter, such a driver is termed an "incomplete" driver. Of the incomplete drivers present (the drivers for groups 2, 3 and 6) the driver furthest to the right is the one in group 6. It should be recalled that the word originally sensed in group 6 was 1100. In step *4a*, group 6 was driven with 1000. It is therefore now necessary to drive group 6 with 0100 as indicated in the flow chart of FIG. 13. When this is done, there is not more than one "1" sensed in any group. Accordingly, the second answer can be recorded. The second answer corresponds to the word recorded on line 8 of the memory.

The procedure above may be continued in the manner set forth in FIG. 14 to obtain the remaining words in the memory. It may be observed that only 15 steps are necessary in this particular case to retrieve nine words written in the memory.

FIGURES 10–12

Figure 11:
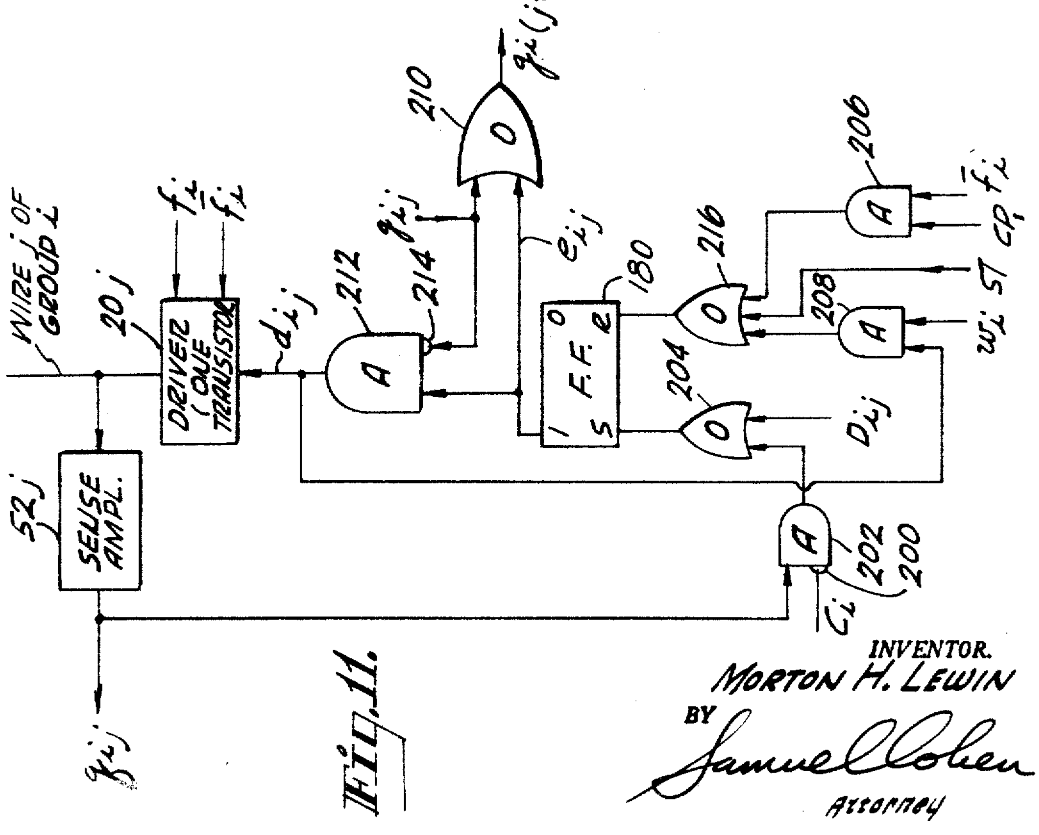
FIG. 11 is a block circuit diagram of the logic circuits for a single wire $j$ of the group of column wires $i$ for the memory of FIG. 9.
Figure 12:
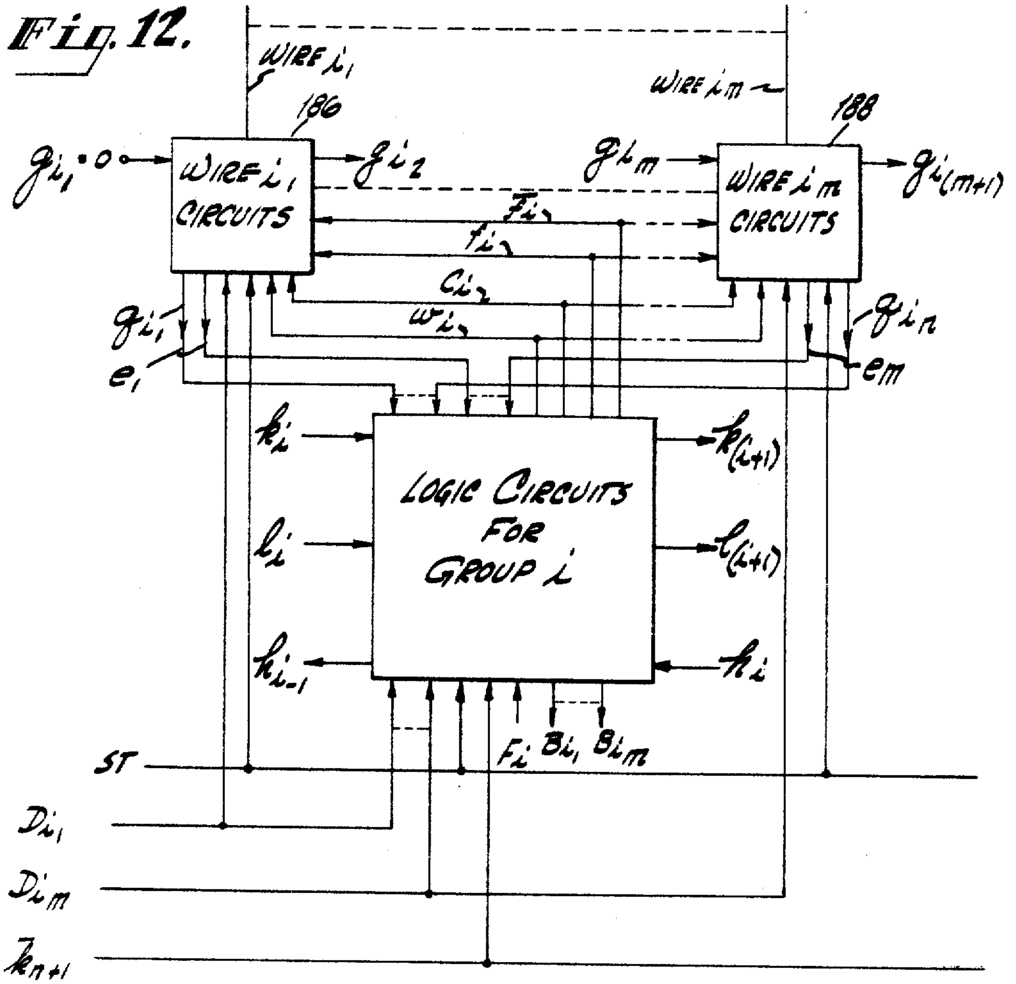
FIG. 12 is a block circuit diagram showing the interconnection among various logic circuits in the memory system of FIG. 9.

The circuits required for implementing the interrogation routine described above are shown in FIGS. 10–12. There are *n* groups of wires in the memory and there are therefore *n* groups of logic circuits, one for each group of wires. The logic circuits for group *i* of the *n* groups of wires is illustrated generally in FIG. 12 by block 184. There are *m* wires in group 1. The first wire is $i_1$, the second $i_2$ and so on and the last wire is $i_m$. Each wire has associated with it certain circuits. The circuits for wire $i_1$ are shown generally at 186 and the circuits for wire $i_m$ are shown generally at 188, both in FIG. 12. The various leads and letters in FIG. 12 illustrate the manner in which the signals in the various blocks flow between blocks. A more detailed showing of the circuits 184 appears in FIG. 10 and a more detailed showing of the circuits for wire *j* of the *m* wires of group *i* appears in FIG. 11. Those of the circuit elements in FIGS. 10 and 11 which are analogous in structure and function to corresponding circuit elements of FIG. 6 have the same reference characters applied.

In the circuits of FIG. 6, each column has two wires. The flip-flop 64 is set when both of the wires carry a "1." In the circuit of FIG. 10, there are *m* column wires in a group of column wires. The signal sensed at the first wire is $q_{i_1}$, the signal sensed at the second wire is $q_{i_2}$ and so on. These signals are applied to a "threshold 2" circuit 190. This may, for example, be a transistor amplifier normally biased to cut-off, which requires two or more input signals to be driven into conduction. Its function is to produce a "1" output when it receives two or more "1" inputs. The output of the threshold circuit 190 is used to set the flip-flop 64. A set flip-flop 64 indicates that there is more than one pattern of bits stored in the *m* wires of group *i* which corresponds to the tag word.

The signals $q_{i_1}$ through $q_{i_m}$ are also applied through an "or" gate 192 to an inverter 194. If there are no "1's" stored in the *m* wires of group *i*, the inverter 174 produces a 1 output. Therefore, $y_i=1$ indicates that there is no pattern of bits stored in the group of wires *i* which corresponds to the tag word.

The "and" gates $62_1$ through $62_m$ are for the purpose of reading out a pattern of bits. When there is only one pattern to be read out which corresponds to the tag word, the $B_{i_1} \ldots B_{i_m}$ pattern read out will consist of one "1" and $m-1$ "0's."

Figure 10:
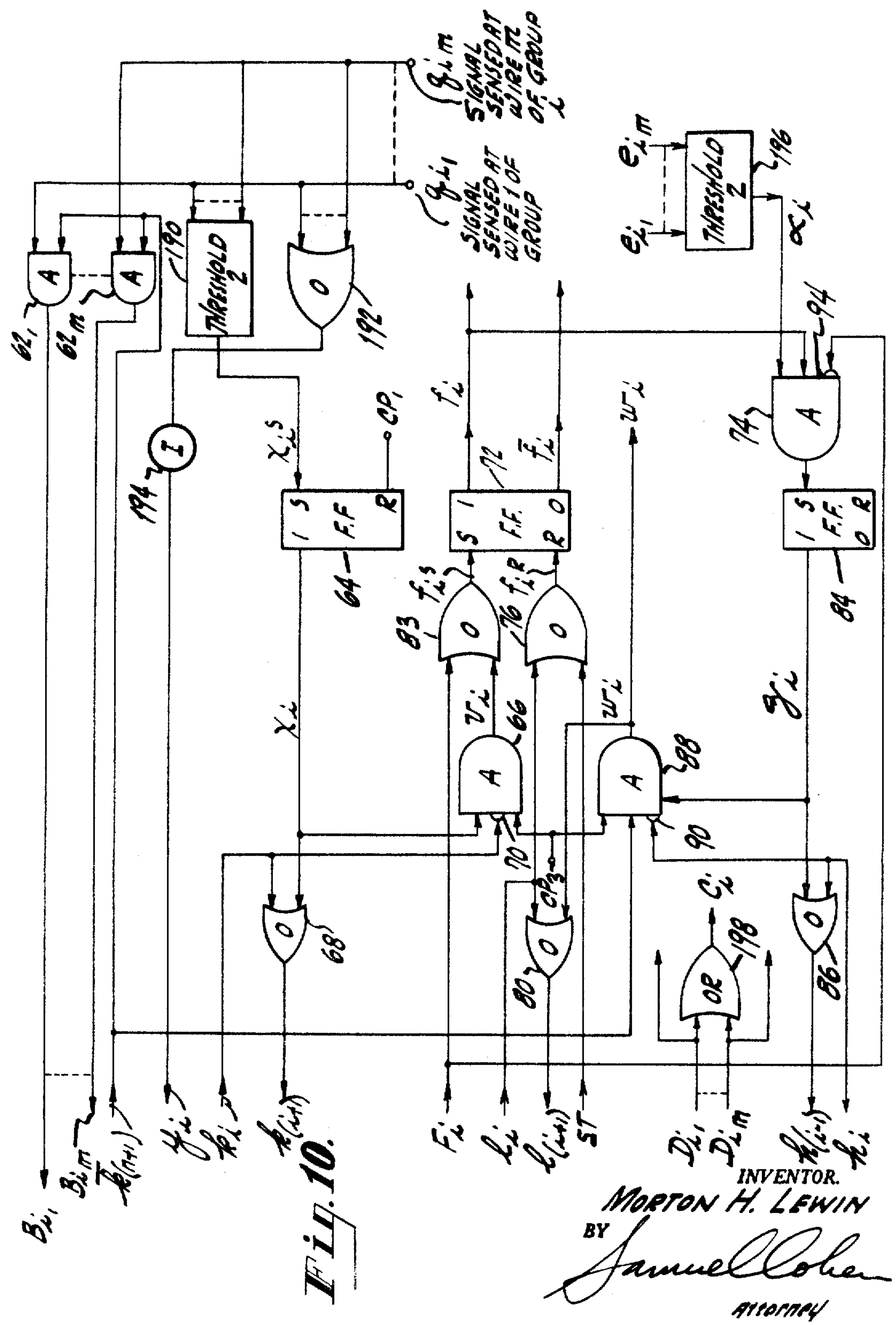
FIG. 10 is a block circuit diagram of the logic circuits which are common to a group of column wires in the memory of FIG. 9.

Another addition to the circuit of FIG. 6 appears at the lower right of FIG. 10. It is the threshold 2 circuit 196 which receives the $e_{i_1}$ through $e_{i_m}$ outputs of the flip-flop 180 (FIG. 11). It produces an output $\alpha_i$ which is applied to "and" gate 74.

As in the previous discussion, the $F_i$ and $D_i$ indicate whether the driver is an original driver and, if so, the character the driver is to apply to its group. $F_i=1$ denotes an original driver. When $F_i=0$, then $D_i=0$ and the driver is either inactive or is a non-original driver depending on the states of the various logic stages, as discussed more fully below. In the present case, if $F_i=0$, $$D_{i_1}=D_{i_2} \ldots D_{i_m}=0$$

If $F_i=1$, only one of $D_{i_1}$ through $D_{i_m}$ is "1" (original driver). If $F_i=1$, flip-flop 72 (FIG. 10) becomes set (through "or" gate 83) and remains set as previously explained. Further, since a "1" is applied to the inhibit input 94 of "and" gate 74, this "and" gate remains inhibited.

If $F_i=1$, then one of $D_{i_1}$ through $D_{i_m}$ is a "1" and "or" gate 198 produces a $C_i=1$ output. $C_{i_1}$ is applied to the inhibit input terminal 200 of "and" gate 202 (FIG. 11). Therefore, flip-flop 180 can be set through "or" gate 204 only if $D_{i_j}=1$. If $D_{i_j}=1$ (and $F_i=1$), then flip-flop 180 becomes set and remains set for the entire interrogation. It cannot be reset via "and" gate 206 since $\bar{f}_i=0$. It cannot be reset via "and" gate 208 since $w_i=0$. ($w_i=0$ because when $F=1$, "and" gate 74 is inhibited, $z_i=0$, and $z_i=0$ inhibits "and" gate 88.) Thus, if there is an original driver present for group *i* and the *j* wire of group *i* is to be driven with a "1," the flip-flop 180 for the *j* wire becomes set and remains set during the entire interrogation. The flip-flop 180 does not become reset until the stop pulse ST is applied to "or" gate 216. The flip-flops 180 for all other wires of group *i* remain reset.

When flip-flop 180 is set and $g_{i_j}$ is "0," "and" gate 212 is energized. Its output $d_{i_j}$ is applied to the driver **20*j*** which applies a "1" to wire *j* of group *i*. Driver **20*j*** consists of only one of the transistor circuits shown in FIG. 7 and it operates in the manner already discussed in connection with FIG. 7.

Before going on with the discussion of the sensing of bits in the various groups, a few shorthand ways of saying things will be discussed. When the memory is driven with a tag word, there may be one or more words in the memory which correspond to the tag word. If more than one word in a memory corresponds to the tag word, more than one "1" will appear in at least one group of wires. The sensing of more than one "1" in a group of wires is hereafter termed the sensing of a "mixture" of patterns. In order to resolve the mixture of patterns, the group of wires carrying the mixture may have to be driven in the manner discussed in connection with the interrogation routine. For example, if the group of wires contains two "1's" as, for example, 0110, first the group may be driven with 0100. At a later time, the group may be driven with 0010. The first state of the driver is hereafter termed an "incomplete" driver. The final state of the driver, that is, the state of the driver when it has resolved all of the patterns in a group, since the last time a mixture was sensed in the group, is hereafter termed a "complete" driver. The incomplete and complete drivers are all non-original drivers. In the case of the memories of FIG. 2, a non-original "0" driver can be considered as an incomplete driver and a non-original "1" driver as a complete driver.

Assume now that the wires of group $i$ are not being driven by an original driver. In this case, $F_i=0$ and all $D_i=0$. If there is a "1" on wire $j$ of group $i$ (FIG. 11), the sense amplifier 52$j$ senses a "1" and $q_{ij}=1$. At the same time, since all $D_i$'s are "0," $C_i=0$. Therefore, "and" gate 202 is activated and a "1" is applied through "or" gate 204 to the set terminal of flip-flop 180. $e_{ij}$ therefore becomes "1." $e_{ij}$ is applied to "or" gate 210. Therefore, all $g_{i(j+1)}$ become "1." This means that all $g_{ij}$ inputs for the wires of group $i$ to the right of the furthest left $j$ wire at which a "1" is sensed are forced to be "1" inhibiting the "and" gates 212 for the wires to the right of the furthest left $j$ wire at which a "1" is sensed. However, the "and" gate 212 for the furthest left $j$ wire at which a "1" is sensed is not inhibited allowing $d_{ij}$ to be "1."

Assume now that the bits sensed at the wires of group $i$ have more than one "1," that is, a mixture is sensed. If the $j$ wire of the $i$ group is the one furthest to the left at which a "1" is sensed, $f_i$ is converted to a "1" through the chain of $k$ "or" gates corresponding to 68 in FIG. 10. In more detail, this "or" gate insures that all succeeding $k$'s are "1." But, $k_i=0$ and therefore, since $x_i=1$, "and" gate 66 is actuated and $v_i=1$. $v_i$ is applied through "or" gate 83 to the set terminal of flip-flop 82. $v_i=1$ signifies the left-most mixture sensed. Thus, in the event that a mixture is sensed and the group containing the mixture is the furthest left group having a mixture, this group is driven with the furthest left wire of the group which had a "1" with a "1" and with all other wires in the group with a "0."

In the case of the memory of FIG. 2, $z_i=1$ denoted a non-original "0" driver. In the present memory of FIG. 9, $z_i=1$ denotes an incomplete driver. The circuit which does this includes the threshold circuit 196. It senses whether there are more than one $e_{ij}=1$ in the group. If there are, $\alpha_i$ becomes "1" and "and" gate 74 becomes energized. (It should be recalled here that $F_i=1$ and $f_i=0$.)

In the interrogation routine previously described, after driving a number of groups in which more than one "1" appears, eventually a condition is reached in which no group has more than one "1." At this time the first word is read out. Thereafter, the group furthest to the right being driven by an incomplete driver must instead be driven by a new pattern produced by the driver. This requires the "or" gates 86 in the $h$ logic chain, which operate in a manner similar to that already discussed in connection with the memory of FIG. 2. In the present instance, $w_i=1$ identifies the incomplete driver furthest to the right. When $w_i=1$, the flip-flop 180 which is furthest to the left in this group becomes reset via "and" gate 208 and "or" gate 216 forcing its corresponding $d_{ij}$ back to "0." When this flip-flop 180 is reset, the inhibiting signal $g_{i(j+1)}$ applied to the "and" gate 212 to its immediate right changes to "0" allowing the latter's $d_{ij}$ to change to "1." Thus, when an incomplete driver is converted to its next state, the set flip-flop 180 furthest to the left in that group is reset permitting the $d_{ij}$ associated with the next set flip-flop 180 to its right to switch to "1." CP3 (the enabling clock pulse for "and" gate 88) is sufficiently narrow that $w_i$ disappears before the next $d_{ij}$ to the left becomes "1." This prevents the immediate resetting of the flip-flop 180 associated with that $d_{ij}$.

This disconnection of complete drivers from their groups is accomplished by the "or" gate chain for $l$ (the "or" gates corresponding to 80). These gates cause all flip-flops 72 to the right of the next incomplete driver to the left to become reset.

When $y_i=1$, this indicates that there are no "1's" sensed in the group. After this time, the B outputs to the buffer storage or display system (not shown) consist of "0's" on all $m$ wires of the group. These "0's" are gated out by $\bar{F}_{n+1}$ which is applied to gates 62$_1$ . . . 62$_m$.

FIGURE 15

The flow chart of FIG. 15 is a generalized chart which shows how any content-addressed memory may be interrogated. It is applicable, for example, both to the memories of FIG. 9 and FIG. 2. The drawing is more or less self-explanatory; however, certain features thereof are discussed in more detail below.

When interrogating any content-addressed memory according to the present invention, it is ordinarily preferable that the words stored in the memory which correspond to the tag word be retrieved from the memory in some sort of order as, for example, chronological order. This is the reason that the column wires of the memory are interrogated in a predetermined order. For example, in the first memory described, the columns are interrogated, that is, driven with "0's" starting at the leftmost column and going toward the right and subsequently the memory is interrogated, that is, driven with "1's" starting at the furthest right column which has a "0" driver and going to the left. However, this is not essential as there may be certain circumstances in which it is desired to retrieve the information in the memory in some order other than chronological order or even according to some random distribution. Further, although in the memories described, all columns in the memory are sensed, this is not essential either. It may be that only part of the information contained in a word is of interest. For example, in a memory storing information concerning insurance policies, only the premium due dates may be of interest during one particular interrogation. In this event, only those column wires storing this information are sensed rather than all of the column wires.

In the routine described in FIG. 15, only those groups of wires of interest are sensed. A group of wires refers to the column wires. In the case of the memory system of FIG. 2, a group of wires consists of two column wires. In the case of the memory of FIG. 9, a group of wires consists of four or nine column wires. In the case of the memory of FIG. 14, a group of wires consists of three or four column wires. In any case, in a group of $m$ wires, there is one "1" and $m-1$ "0's."

When more than one "1" is sensed in one or more groups of wires, a group of wires in which more than one "1" appears is driven with a pattern of bits to eliminate all except one of the "1" bits. It should be noted that in the generalized drawing, the particular group of wires to be driven is not specified. Any group will do, however, if the groups are not driven in some particular order, then the words or messages will be retrieved from the memory also in no particular order. Further, it is not essential that the furthest left wire in the group of wires containing more than one "1" be driven with a "1" first and all other wires driven with a "0" and then the next right wire be driven with a "1" and all other wires with a "0" and so on. Any of the wires in which a "1" appeared the last time more than one "1" was sensed in a group can be driven with a "1."

What is claimed is:

1. The combination comprising a content-addressed memory which stores words in random order in different rows; and means responsive to a tag word applied to the memory to which *m* words in the memory correspond for retrieving said *m* words in an order related to the content of the words, where *m* is an integer greater than 1.

2. The combination comprising a content-addressed memory having *n* columns and *q* rows which stores up to *q* words in said *q* rows; and means responsive to a *y* bit tag word applied to *y* columns of the memory to which *m* of the *q* words in the memory correspond for retrieving said *m* words in an order related to the content of the words, where *y* is an integer not greater than *n*, and *m* is an integer greater than 1 but not greater than *q*.

3. In a method of retrieving words stored in rows of a content-addressed memory having columns and rows, the steps of first driving at least one column of the memory with a tag bit to produce on at least one other column of the memory signals indicative both of the bits 1 and 0 when the bit corresponding to the tag bit in more than one word in the memory matches the tag bit, and then driving any other column of the memory which produces output signals indicative both of bits of value "zero" and "one" with signals indicative of binary bits in accordance with a predetermined program.

4. In a method of retrieving words stored in rows of a content-addressed memory of the type having *n* columns, each with two conductors, and *q* rows, each with one conductor, and having also up to *nq* storage elements, one connected between one conductor of each column and each row, the steps of applying a *y* bit tag word to *y* columns of the memory; sensing for the presence of signals indicative of the binary bits 1, 1 in the two conductors of any column; in response thereto, applying signals indicative of binary bits to the columns at which 1, 1 appear, in accordance with a predetermined program, until 1, 1 no longer appears in a column; and, when 1, 1 is no longer sensed in any column, retrieving a word from the memory by sensing the signals appearing at the columns thereof, where *n* and *q* are integers, and *y* is an integer no greater than *n*.

5. In a method of retrieving words stored in rows of a content-addressed memory of the type having *n* columns, each with two conductors, and *q* rows, each with one conductor and having also up to *nq* storage elements, one connected between one conductor of each column and each row, the steps of applying a *y* bit tag word to *y* columns of the memory; sensing for the presence of signals indicative of the binary bits 1, 1 at the respective conductors of any column; in response thereto, applying signals indicative of binary bit "zero" to the columns at which 1, 1 appear, in sequence, until 1, 1 no longer appears in any column; and, when 1, 1 is no longer sensed in any column, retrieving a word from the memory by sensing the signals appearing at the columns thereof, where *n* and *q* are integers, *y* is an integer no greater than *n*.

6. In a method of retrieving words stored in rows of a content-addressed memory of the type having *n* columns, each with two conductors, and *q* rows, each with one conductors, and having also up to *nq* storage elements, one connected between one conductor of each column and each row, the steps of applying a *y* bit tag word to *y* columns of the memory; sensing for the presence of signals indicative of the binary bits 1, 1 at the respective conductors of any column; in response thereto, applying signals indicative of binary bit "zero" to the columns at which 1, 1 appear, in sequence, until 1, 1 no longer appears in a column; when 1, 1 is no longer sensed in any column, retrieving a word from the memory by sensing the signals appearing at the columns thereof; then, starting at the last column at which 1, 1 appeared, driving that column with signals indicative of the binary bit "one"; and, if no 1, 1 appears in any column retrieving a second word from the memory by sensing the signals appearing at the columns thereof, where *n* and *q* are integers, and *y* is an integer no greater than *n*.

7. In a method of retrieving words stored in rows of a content-addressed memory of the type having *n* columns, each with two conductors, and *q* rows, each with one conductor, and having also up to *nq* storage elements, one connected between one conductor of each column and each row, the steps of applying a *y* bit tag word to *y* columns of the memory; sensing for the presence of signals indicative of the binary bits 1, 1 at the respective conductors of any column; in response thereto, applying signals indicative of binary bit "zero" to the columns at which 1, 1 appear, in sequence, until 1, 1 no longer appears in a column; when 1, 1 is no longer sensed in any column, retrieving a word from the memory by sensing the signals appearing at the columns thereof; then starting at the last column at which 1, 1 appeared driving that column with signals indicative of the binary bit "one," if no 1, 1 appears in any column, retrieving a second word from the memory by sensing the signals appearing at the columns thereof; if one or more 1, 1's appear in said columns, driving said columns in which 1, 1 appears, in sequence with signals indicative of binary bit "zero" until 1, 1 is no longer sensed in any column; and then retrieving a second word from the memory by sensing the signals appearing at the columns thereof, where *n* and *q* are integers, and *y* is an integer no greater than *n*.

8. In combination, a content-addressed memory having *n* columns, each with two conductors, and *q* rows, and a storage element connected between one of each two column conductors and each row, the one of the two conductors in a column to which the storage element is connected indicating the value of the binary bit represented by the storage element; means for applying a tag word to *y* of the columns; means connected to said columns for sensing the words stored in the memory corresponding to the tag word; and means responsive to the reception by the sensing means of signals indicative of the bits 1, 1 in the two conductors of a column for interrogating that column in accordance with a predetermined program for retrieving the words in the memory corresponding to the tag word, where *q* and *n* are integers greater than 1, and *y* is an integer not greater than *n*.

9. In combination, a content-addressed memory having *n* columns, each with two conductors, and *q* rows, and a storage element connected between one of each two column conductors and each row, the one of the two conductors in a column to which the storage element is connected indicating the value of the binary bit represented by the storage element; means for applying signals indicative of the *y* bits of a tag word to *y* of the columns, respectively; means connected to said columns for sensing the words stored in the memory corresponding to the tag word; and means responsive to the reception by the sensing means of signals indicative of the bits 1, 1 in the two conductors of a column for applying first a signal indicative of the binary bit of one value and then a signal indicative of the binary bit of other value to that column in accordance with a predetermined program for retrieving the words in the memory corresponding to the tag word, where *q* and *n* are integers greater than 1, and *y* is an integer not greater than *n*.

10. In combination, a content-addressed memory having *n* columns, each with two conductors, and *q* rows, and a diode connected between one of each two column conductors and each row, the one of the two conductors in a column to which the diode is connected indicating the value of the binary bit represented by the storage element; means for applying signals indicative of the *y* bits of a tag word to *y* of the columns, respectively; means connected to said columns for sensing the words stored in the memory corresponding to the tag word; and means responsive to the reception by the sensing means of signals indicative of the bits 1, 1 in the two conductors of a column for applying signals indicative of the binary bits "one" and "zero" to that column in accordance with a predetermined program for retrieving the words in the memory corresponding to the tag word, where $q$ and $n$ are integers greater than 1, and $y$ is an integer not greater than $n$.

11. In combination, a content-addressed memory having $n$ groups of column conductors, and $q$ row conductors, and a storage element connected between not more than one conductor of each group of column conductors and each row conductor, the conductor in a group of column conductors to which the storage element is connected representing a binary bit of one value, and all other conductors of said group representing a binary bit of other value; means for applying a tag word to $y$ of the groups of column conductors; means connected to at least some of said groups of column conductors for sensing groups of bits stored in the memory corresponding to the tag word; and means responsive to the reception by the sensing means of signals indicative of said binary bit of one value on more than one column conductor of a group of said column conductors, for interrogating the memory in accordance with a predetermined program for retrieving groups of bits stored in the memory corresponding to the tag word, where $n$, $q$ and $y$ are all integers, and each group of column conductors has at least two such conductors.

12. In combination, a content-addessed memory of the type having $n$ columns, each with two conductors, and $q$ rows and having up to $nq$ storage elements, one connected between one conductor of each column and each row, said memory providing an output indicative of a 0 at a column when a signal passes from a row conductor through a storage element to one of the column conductors and providing an output indicative of a 1 in a column when a signal passes from a row conductor through a storage element to the other conductor of said column, and said memory providing outputs at a column indicative both of the bits 1 and 0, hereafter termed a 1, 1 output, when signals pass from row conductors through storage elements to both conductors of a column;

means for applying signals indicative of a $y$ bit tag word to $y$ columns of the memory;

means responsive to the presence of a 1, 1 output from the memory for applying to the columns at which 1, 1 appears, in sequence, signals indicative of a bit of given value until 1, 1 no longer appears at any column; and means for then applying signals indicative of the bit of other value to the last column at which 1, 1 appeared and, if one or more 1, 1's appear in other columns as a result of the application of the bit of other value, for driving said other columns, in sequence, with signals indicative of the bit of given value until 1, 1 no longer appears at any column, where $n$ and $q$ are integers and $y$ is an integer no greater than $n$.

13. In combination, a content-addressed memory of the type having $n$ columns, each with two conductors, and $q$ rows and having up to $nq$ storage elements, one connected between one conductor of each column and each row, said memory providing an output indicative of a 0 at a column when a signal passes from a row through a storage element to one of the column conductors and providing an output indicative of a 1 in a column when a signal passes from a row through a storage element to the other conductor of said column, and said memory providing outputs at a column indicative both of the bits 1 and 0, hereafter termed a 1, 1 output, when signals pass from rows through storage elements to both conductors of a column;

means for applying signals indicative of a $y$ bit tag word to $y$ columns of the memory, whereby if one or more $y$ bit words which correspond to the tag word are stored in said $y$ columns, a signal appears on the row or rows storing said words;

means responsive to a 1, 1 output from the memory for applying to the columns at which 1, 1 appears, in sequence, signals indicative of a bit of given value until 1, 1 no longer appears at any column; and means for then reading out the signals appearing on the columns of the memory, said signals indicating a word stored in the memory which is called for by the tag word, where $n$ and $q$ are integers, and $y$ is an integer no greater than $n$.

14. A method of retrieving from a content-addressed memory having a matrix of storage elements arranged in columns and rows, one or more words corresponding to a tag word, comprising the steps of:

(1) applying to $y$ columns of the memory, signals indicative of the $y$ bits of a tag word, respectively;

(2) sensing for the presence of output signals at the columns of the memory;

(3) if an X output signal is sensed at one or more columns, applying a W signal to one of said columns, and then repeating step (2);

(4) if an X output signal is still sensed at one or more of the columns, repeating step (3);

(5) if after step (3), no X output signal is present at any column, reading out a word from the memory;

(6) then removing from a column a W signal applied in step (3), applying a V signal thereto instead, and repeating step (2);

(7) if an X output signal is sensed at any column, repeating step (3) until an X signal is no longer present in any column, and then reading out the next word from the memory;

(8) removing any V signals previously applied; and (9) repeating steps (6), (7) and (8) as many times as necessary to read out from the memory all of the words therein corresponding to the tag word; where:

$y$ is an integer;

an X signal is a signal indicating the presence of more than one stored word in the memory corresponding to the tag word, one of these corresponding stored words containing a "one" at the bit position intersected by the column at which the X signal is sensed, and another of these corresponding stored words containing a "zero" at the same bit position;

a W signal is one which corresponds to a bit of one value; and a V signal is one which corresponds to a bit of other value.

References Cited

UNITED STATES PATENTS 3,034,101 5/1962 Loewe ---------- 340—172.5

OTHER REFERENCES

Pages 179–187, Dec. 13–15, 1960—Seeber, "Associative Self-Sorting Memory," Proceedings of the Eastern Joint Computer Conference.

ROBERT C. BAILEY, *Primary Examiner.*

MALCOLM A. MORRISON, *Examiner.*

P. J. HENON, PETER BERGER, G. D. SHAW, *Assistant Examiners.*